US010558809B1

(12) United States Patent
Joyce et al.

(10) Patent No.: US 10,558,809 B1
(45) Date of Patent: Feb. 11, 2020

(54) SOFTWARE ASSURANCE SYSTEM FOR RUNTIME ENVIRONMENTS

(71) Applicant: Architecture Technology Corporation, Minneapolis, MN (US)

(72) Inventors: Robert A. Joyce, Ithaca, NY (US); Matthew P. Donovan, Trumansburg, NY (US)

(73) Assignee: ARCHITECTURE TECHNOLOGY CORPORATION, Minneapolis, MN (US)

( * ) Notice: Subject to any disclaimer, the term of this patent is extended or adjusted under 35 U.S.C. 154(b) by 237 days.

(21) Appl. No.: 15/485,784

(22) Filed: Apr. 12, 2017

(51) Int. Cl.
| G06F 21/57 | (2013.01) |
| G06F 21/52 | (2013.01) |
| G06N 20/00 | (2019.01) |
| G06T 11/60 | (2006.01) |
| G06T 11/20 | (2006.01) |

(52) U.S. Cl.
CPC ............ G06F 21/577 (2013.01); G06F 21/52 (2013.01); G06N 20/00 (2019.01); G06F 2221/033 (2013.01); G06F 2221/034 (2013.01); G06T 11/206 (2013.01); G06T 11/60 (2013.01); G06T 2200/24 (2013.01)

(58) Field of Classification Search
CPC .. G06F 21/577; G06F 21/50; G06F 2221/033; G06F 2221/034; G06N 20/00; G06T 2200/24; G06T 11/60; G06T 11/206
See application file for complete search history.

(56) References Cited

U.S. PATENT DOCUMENTS

| 5,974,549 A | 10/1999 | Golan |
| 7,496,959 B2 | 2/2009 | Adelstein et al. |

(Continued)

FOREIGN PATENT DOCUMENTS

WO  2017105383 A1  6/2017

OTHER PUBLICATIONS

Atighetchi et al., "Metrinome-Continuous Monitoring and Security Validation of Distributed Systems", Journal of Cyber Security and Information Systems vol. II, No. 1: Knowledge Management, Mar. 2014, 8 pgs.

(Continued)

*Primary Examiner* — Alexander Lagor
*Assistant Examiner* — Vu V Tran
(74) *Attorney, Agent, or Firm* — Shumaker & Sieffert, P.A.

(57) ABSTRACT

An example method includes monitoring execution of one or more applications on a runtime computing system that includes a plurality of processing units, receiving, from the runtime computing system during execution of the applications, monitoring information that includes at least one of function call data or application programming interface call data associated with operations performed by the plurality of processing units during execution of the applications, importing the monitoring information into a risk model, analyzing the monitoring information within the risk model to determine one or more potential vulnerabilities and one or more impacts of the one or more vulnerabilities in the runtime computing system, and outputting, for display in a graphical user interface, a graphical representation of the one or more potential vulnerabilities and the one or more impacts within the risk model.

29 Claims, 10 Drawing Sheets

(56) References Cited

U.S. PATENT DOCUMENTS

| | | | |
|---|---|---|---|
| 7,818,804 | B2 | 10/2010 | Marceau |
| 7,962,961 | B1 | 6/2011 | Griffin et al. |
| 8,156,483 | B2* | 4/2012 | Berg .................. G06F 8/43 717/143 |
| 8,296,848 | B1* | 10/2012 | Griffin ............... G06F 21/577 715/201 |
| 8,458,805 | B2 | 6/2013 | Adelstein et al. |
| 8,499,354 | B1* | 7/2013 | Satish ................ G06F 9/44521 726/22 |
| 8,862,803 | B2 | 10/2014 | Powers et al. |
| 9,076,342 | B2 | 7/2015 | Brueckner et al. |
| 9,081,911 | B2 | 7/2015 | Powers et al. |
| 9,083,741 | B2 | 7/2015 | Powers |
| 9,384,677 | B2 | 7/2016 | Brueckner et al. |
| 2012/0210427 | A1 | 8/2012 | Bronner et al. |
| 2014/0337971 | A1* | 11/2014 | Casassa Mont ...... G06F 21/552 726/22 |
| 2015/0213260 | A1* | 7/2015 | Park .................... G06F 21/54 726/23 |
| 2015/0339477 | A1 | 11/2015 | Abrams et al. |
| 2016/0099953 | A1 | 4/2016 | Hebert et al. |
| 2016/0234242 | A1* | 8/2016 | Knapp ............... H04L 63/1433 |
| 2018/0048534 | A1 | 2/2018 | Banga et al. |
| 2018/0121657 | A1* | 5/2018 | Hay .................... G06F 21/577 |
| 2018/0191770 | A1 | 7/2018 | Nachenberg et al. |
| 2018/0367563 | A1 | 12/2018 | Pfleger de Aquiar et al. |
| 2019/0014153 | A1 | 1/2019 | Lang et al. |
| 2019/0102564 | A1 | 4/2019 | Li et al. |
| 2019/0164015 | A1 | 5/2019 | Jones, Jr. et al. |
| 2019/0188615 | A1 | 6/2019 | Liu |
| 2019/0258953 | A1 | 8/2019 | Lang et al. |

OTHER PUBLICATIONS

Sironi et al., "Metronome" Operating System Level Performance Management via Self-Adaptive Computing, DAC 2012, Jun. 3-7, 2012, 10 pgs.

Vasiliadis et al., "GPU-asssisted malware", Int. J. Inf. Secur. (2015), Published Aug. 28, 2014, 9 pgs.

Balzarotti et al., "The impact of GPU-assisted malware on memory forensics: A case study", DFRWS 2015, 9 pgs. Applicant points out, in accordance with MPEP 609.04(a), that the year of publication, 2015, is sufficiently earlier than the effective U.S. filing date of the present application, so that the particular month of publication is not in issue.

Baloch et al., "Comparative Study of Risk Management in Centralized and Distributed Software Development Environment", Sci. Int.(Lahore),26(4),1523-1528, 2014, 6 pgs. Applicant points out, in accordance with MPEP 609.04(a), that the year of publication, 2014, is sufficiently earlier than the effective U.S. filing date of the present application, so that the particular month of publication is not in issue.

PR Newswire, "ATCorp Releases CSAS-Cloud Security Analysis Suite for Applications in the Cloud" Feb. 26, 2016, 2 pgs.

Wikipedia-OpenCL, Mar. 29, 2017, Retrieved from https://en.wikipedia.org/wiki/OpenCL, 15 pgs.

ROSE: Main Page, Mar. 29, 2017, Retrieved from http://rosecompiler.org/ROSE_HTML_Reference/, 3 pgs.

Schneier, "Attack Trees-Schneier on Security", Dr. Dobb's Journal, Dec. 1999, Retrieved from https://www.schneier.com/academic/archives/1999/12/attack_trees.html, 9 pgs.

CERIAS: "Memory Analysis, meet GPU Malware", Oct. 22, 2014, Retrieved from http://www.cerias.purdue.edu/news_and_events/events/security_seminar/details/index/popenihmencsf2v5 mggg5ulfd4, 2 pgs.

2015 DFRWS Forensics Challenge—Submitted Solutions and Source Code Released, Retrieved from http://www.cs.uno.edu/~golden/gpu-malware-research.html, 5 pgs. Applicant points out, in accordance with MPEP 609.04(a), that the year of publication, 2015, is sufficiently earlier than the effective U.S. filing date of the present application, so that the particular month of publication is not in issue.

Quinlan et al., "ROSE User Manual: A Tool for Building Source-to-Source Translators," Draft User Manual, Version 0.9.6a, Lawrence Livermore National Laboratory, Dec. 16, 2015, 339 pp.

Joyce et al., "MEGA: A Tool for Mac OS X Operating System and Application Forensics," Proceedings of the Digital Forensic Research Conference, Aug. 11-13, 2008, 9 pp.

Fisher, "Developing Software in a Multicore & Multiprocessor World," Klocwork.com., white paper, Sep. 2010, 9 pp.

"Cybersecurity," U.S. Department of Defense Instruction, No. 8500.01, Mar. 14, 2014, 59 pp, accessible via https://www.esd.whs.mil/Portals/54/Documents/DD/issuances/dodi/850001_2014.pdf.

"Cyberspace Operations," U.S. Air Force, Air Force Policy Directive 10-17, Jul. 31, 2012, 9 pp, accessible via https://fas.org/irp/doddir/usaf/afpd10-17.pdf.

Libicki, "Cyberdeterrence and Cyberwar," Rand Corporation, Oct. 8, 2009, 238 pp.

Porche III et al., "A Cyberworm that Knows no Boundaries," Rand Corporation, May 20, 2011, 6 pp.

Shiva et al., "Game Theory for Cyber Security," Proceedings of the Sixth Annual Workshop on Cyber Security and Information Intelligence Research, Article No. 34, Apr. 2010, 5 pp.

Snyder et al., "Ensuring U.S. Air Force Operations During Cyber Attacks Against Combat Support Systems Guidance Where to Focus Mitigation Efforts," Rand Corporation, 2015, 36 (Applicant points out, in accordance with MPEP 609.04(a), that the year of publication, 2015, is sufficiently earlier than the effective U.S. filing date, so that the particular month of publication is not in issue.).

Becker et al., "Applying Game Theory to Analyze Attacks and Defenses in Virtual Coordinate Systems," 41st International Conference on Dependable Systems & Networks (DSN), Jun. 2011, 12 pp.

U.S. Appl. No. 15/622,434, filed Jun. 14, 2017 by Robert A. Joyce et al.

U.S. Appl. No. 16/131,669, filed Sep. 14, 201 by Christopher Dominessy et al.

Challagulla et al., ""Empirical Assessment of Machine Learning based Software Defect Prediction Techniques,"" Proceedings of the 10th IEEE International Workshop on Object-Oriented Real-Time Dependable Systems (WORDS'05), Feb. 2-4, 2005, 8 pp.

Henriques de Gusmao et al., "Cybersecurity risk analysis model using fault tree analysis and fuzzy decision theory," International Journal of Information Management, Jul. 20, 2018, 2 pp.

Jones, "Software Defect Origins and Removal Methods," International Function Point Users Group, Dec. 28, 2012, 29 pp.

McHale, "The Aegis Combat System's continuous modernization," Military Embedded Systems, retrieved from http://mil-embedded.com/articles/the-aegis-combat-systems-continuous-modernization/, Aug. 26, 2016, 7 pp.

Rahman et al., "Defect Management Life Cycle Process for Software Quality Improvement," World Academy of Science, Engineering and Technology International Journal of Computer and Information Engineering, vol. 9, No. 12, Nov. 24, 2015, 4 pp.

Robbio, "How Will AI Impact Software Development?" Forbes Technology Council, Aug. 31, 2017, 4 pp.

U.S. Appl. No. 16/440,654, filed Jun. 13, 2019 by Joseph Sirianni et al.

* cited by examiner

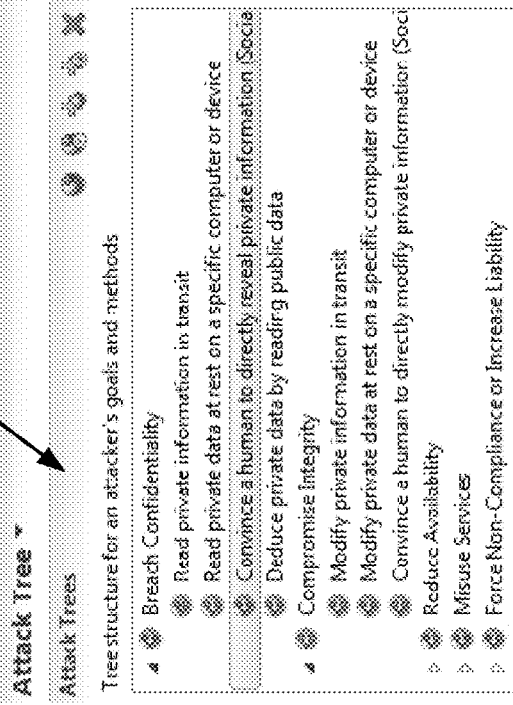
FIG. 5

Test Details: CVE-2014-9367
NVD lookup

Overall Result: Fail (Requirements not Met; Attack is Possible) ▶

Justification/Notes:

Tags: Add tag...

▼ Attributes and Computed Values
Data and fixed or dynamic values associated with this goal

| Name | Type/Function | Value |
|---|---|---|
| CVSS Score | Numeric | 4.3 |
| CVE: Access Vector | String | NETWORK |
| CVE: Access Complexity | String | MEDIUM |
| CVE: Authentication Required | String | NONE |
| CVE: Confidentiality Impact | String | NONE |
| CVE: Integrity Impact | String | PARTIAL |
| CVE: Availability Impact | String | NONE |

← 124

Test Result: Fail (Requirements not Met; Attack is Possible)
Test Time: Oct 1    2:50:39 PM
Vulnerability: CVE-2014-9367
CVSS Score: 4.3

Incomplete blacklist vulnerability in the urlEncode function in lib/TWiki.pm in TWiki 6.0.0 and 5.0.1 allows remote attackers to conduct cross-site scripting (XSS) attacks via a "'" (single quote) in the scope parameter to do/view/TWiki/WebSearch.

SOFTWARE ASSURANCE SYSTEM FOR RUNTIME ENVIRONMENTS

STATEMENT REGARDING FEDERALLY SPONSORED RESEARCH OR DEVELOPMENT

This invention was made with government support under Contract No. W56KGU-17-C 0015 awarded by the U.S. Army. The government has certain rights in this invention.

BACKGROUND

Software assurance tools are often used to identify possible vulnerabilities or potentially malicious code in software systems, including Commercial Off-The-Shelf (COTS) software systems. Security may be put at risk by such vulnerabilities or malicious code in these systems. It is often helpful to identify any risks early in the software development lifecycle, long before final integration, deployment, and long-term support take place. Existing automated tools are capable of examining source or binary code statically, before execution, and/or dynamically, such as by observing internal or external behavior of the executed code or by inserting probes.

Existing software assurance tools have a number of advantages, such as speed and volume of coverage. However, these advantages come at the cost of limited breadth of scope and over specialization. Many of these existing tools require source code access, which may not, in many cases, be available or readily accessible. Additionally, existing tools may identify lists of potential vulnerabilities that are largely incomplete (i.e., many false negatives), or which contain false positives that require large amounts of human analysis to triage.

SUMMARY

In one example, a method includes monitoring, by an analysis computing system, execution of one or more applications on a runtime computing system, wherein the runtime computing system includes a plurality of processing units that perform one or more operations during execution of the one or more applications, and, during execution of the one or more applications on the runtime computing system, receiving, by the analysis computing system and from the runtime computing system, monitoring information that includes at least one of function call data or application programming interface call data associated with the one or more operations performed by the plurality of processing units during execution of the one or more applications. The example method further includes importing, by the analysis computing system, the monitoring information into a risk model, analyzing, by the analysis computing system, the monitoring information within the risk model to determine one or more potential vulnerabilities and one or more potential impacts of the one or more potential vulnerabilities in the runtime computing system, wherein the one or more potential vulnerabilities are associated with execution of the one or more applications on the runtime computing system, and outputting, by the analysis computing system and for display in a graphical user interface, a graphical representation of the one or more potential vulnerabilities and the one or more potential impacts within the risk model.

In one example, a computing system includes one or more processing units, and a non-transitory computer-readable storage medium storing instructions that, when executed, cause the one or more processing units to: monitor execution of one or more applications on a runtime computing system, wherein the runtime computing system includes a plurality of processing units that perform one or more operations during execution of the one or more applications; during execution of the one or more applications on the runtime computing system, receive, from the runtime computing system, monitoring information that includes at least one of function call data or application programming interface call data associated with the one or more operations performed by the plurality of processing unit during execution of the one or more applications; import the monitoring information into a risk model; analyze the monitoring information within the risk model to determine one or more potential vulnerabilities and one or more potential impacts of the one or more potential vulnerabilities in the runtime computing system, wherein the one or more potential vulnerabilities are associated with execution of the one or more applications on the runtime computing system; and output, for display in a graphical user interface, a graphical representation of the one or more potential vulnerabilities and the one or more impacts within the risk model.

In one example, a non-transitory computer-readable storage medium stores instructions that, when executed, cause a computing system to perform operations. The operations include monitoring execution of one or more applications on a runtime computing system, wherein the runtime computing system includes a plurality of processing units that perform one or more operations during execution of the one or more applications, and, during execution of the one or more applications on the runtime computing system, receiving, from the runtime computing system, monitoring information that includes at least one of function call data or application programming interface call data associated with the one or more operations performed by the plurality of processing units during execution of the one or more applications. The operations further include importing the monitoring information into a risk model, analyzing the monitoring information within the risk model to determine one or more potential vulnerabilities and one or more potential impacts of the one or more potential vulnerabilities in the runtime computing system, wherein the one or more potential vulnerabilities are associated with execution of the one or more applications on the runtime computing system, and outputting, for display in a graphical user interface, a graphical representation of the one or more potential vulnerabilities and the one or more impacts within the risk model.

The details of one or more examples are set forth in the accompanying drawings and the description below, Other features, objects, and advantages of the disclosure will be apparent from the description and drawings, and from the claims.

BRIEF DESCRIPTION OF DRAWINGS

FIGS. 5-8 are screen diagrams illustrating example information included in a risk model that may be output for display, in accordance with one or more aspects of the present disclosure.

DETAILED DESCRIPTION

Figure 1:
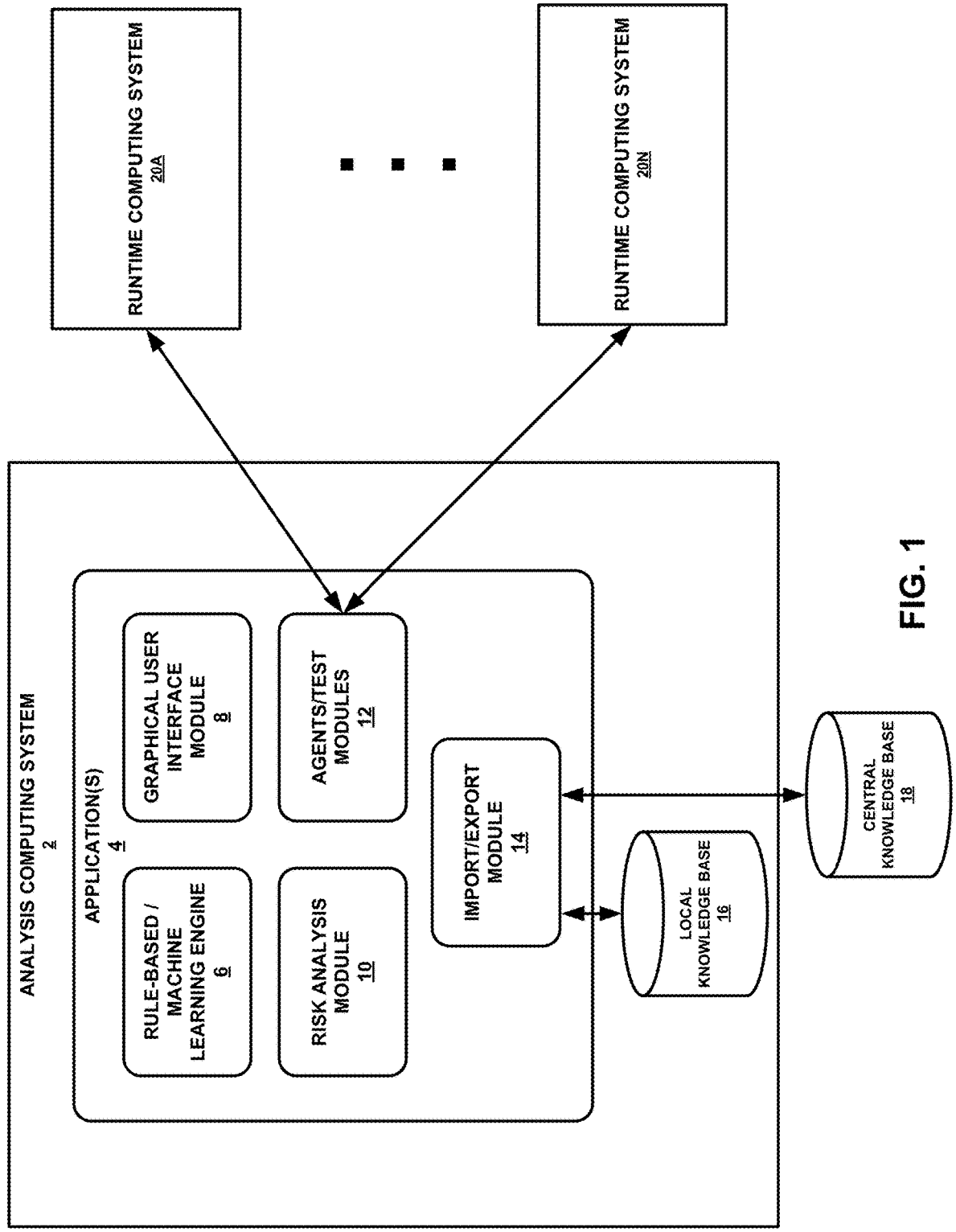
FIG. 1 is a block diagram illustrating an example analysis computing system and example runtime computing systems, in accordance with one or more aspects of the present disclosure.

As described above, existing software assurance took are often used to identify possible vulnerabilities or potentially malicious code in runtime software systems. These existing tools, however, do not address the threats posed by modern, heterogeneous runtime systems such as distributed or cloud computing systems, or systems that includes hardware accelerators such as a graphics processing unit (GPU) or a field-programmable gate array (FPGA). Nearly all existing automated software assurance tools assume a traditional computing architecture with a single machine, or even a single central processing unit, running a single, monolithic application. Modern hardware and software architectures do not match this assumption. Typical desktop, laptop, and server systems often contain a GPU and use it to accelerate certain non-graphics software functions. Some systems contain other specialized acceleration hardware, such as a coprocessor card, FPGA's, or custom silicon. Even systems without a dedicated GPU often have GPU capabilities built in to the motherboard chipset. Further, many services now run as virtual machines (VM's), either locally or in a cloud-based framework, to enhance deployment flexibility and reduce costs. VM hypervisors, however, introduce their own set of potential vulnerabilities.

On the software side, modern software architectures make use of large numbers of libraries, frameworks, and external processes often in a distributed manner across computing nodes. While a given library may not be malicious, it may be possible to misuse it in a malicious, or at least vulnerable, manner. For example, libraries linking popular coding languages to databases do not require the use of parameterized queries. Thus, poor coding practices can allow a web application to be vulnerable to injection attacks that put the back-end database at risk.

Another shortcoming of current automated tools is that they are often overly specialized, generating reports for individual software modules without providing any context fur the alerts they generate. For instance, passive source-code tools can generate large numbers of alerts, many of which are irrelevant to the application in context. System-level tools often attempt to find program inputs that cause incorrect behavior, but they often only effect specific kinds of attacks. Thus, an overall security model that incorporates the results of multiple tools, run over the libraries and operating system configurations in use, and with a particular focus on interactions between libraries and other processes, may be particularly beneficial. This model would enable an analyst see the alerts in context, allowing the analyst to assess overall severities and prioritize fixes, potentially saving significant time and effort.

The techniques of the present disclosure provide a software assurance tool that combines monitoring and detection mechanisms (e.g., for GPU-assisted malware) with a risk model to put alerts into context. This software assurance tool may be used in heterogeneous runtime environments (e.g., environment that include different types of hardware components or processing units, such as GPU's and/or FPGA's). The disclosed techniques, in some cases, use function call and application program interface (API) hooking to detect potential misuse or unexpected call sequences, via rules and/or machine learning techniques, for input into and use by a hierarchical risk model, thereby showing the analysis results in context within the model. In some cases, the results of the analysis may be combined with information from external probes, configuration tests, or other tools for input into the risk model. In doing so, the techniques may enable a security analyst to discover vulnerabilities and potentially malicious code in a software system (e.g., a system that includes GPU-accelerated software), and determine the possible risks that such vulnerabilities pose to overall mission success.

The disclosed techniques may improve software assurance by providing more thorough analysis against the types of threats and runtime environments seen in modern computing architectures, providing an increased visibility to threats specific to code running on certain types of components (e.g., GPU's) in heterogeneous platforms or in a distributed/cloud environment. By providing alerts in context, the present techniques enable an analyst to prioritize important changes and see the impact of potential vulnerabilities or malicious code. This prioritization may save time and effort, allowing the analyst to focus on the critical or cost-effective changes.

The present techniques may implement an active design model defined by real-time testing and/or monitoring to detect vulnerabilities to known hacking techniques, malicious code variants, and interfaces to insecure components (e.g., off-the-shelf components), and, in some cases, using machine learning algorithms to detect intentional and unintentional secure coding issues. This type of analysis can leverage dynamic testing techniques to find potential vulnerabilities. A passive design model may also be defined by uncovering deliberately injected malicious code logic including the detection of specialized types of malicious code (e.g., GPU-assisted malware) in already developed software applications.

The disclosed techniques may provide a high level of cybersecurity for the developer and security professional. The ability of the tools described herein to actively recognize potential malicious code and potential vulnerabilities as a system is developed may provide critical security throughout the software development lifecycle, which may significantly reduce costs. By finding potential vulnerabilities earlier in the lifecycle, rather than through problem reports after systems are fielded, sustainment costs can he reduced, and system readiness enhanced. The recognition of the potential for malicious attacks (e.g., via use of a GPU) has far reaching benefit for security as well, given the high number of systems that now routinely incorporate various different types of hardware components in their architectures.

FIG. 1 is a block diagram illustrating an example analysis computing system 2 and example runtime computing systems 20A-20N, in accordance with one or more aspects of the present disclosure. As shown in FIG. 1, analysis computing system 2 is communicatively coupled to one or more runtime computing systems 20A-20N (collectively, "runtime computing systems 20"). Analysis computing system 2 is configured to execute one or more applications 4 in order to analyze operation of runtime computing systems 20. Analysis computing system 2 includes a local knowledge base 16, and it is also communicatively coupled to a central knowledge base 18, which may, in some cases, be remote from and external to analysis computing system 2. As shown in FIG. 1, and as will be described in further detail below, applications 4 may include a rule-based and/or machine learning engine 6, a graphical user interface module 8, a risk analysis module 10, one or more agents or test modules 12, and import/export module 14.

Using analysis computing system 2, an analyst is able to use multiple kinds of evaluations provided by risk analysis module 10 (e.g., including GPU-specific or API-agnostic active testing evaluations) to generate an overall risk assessment for one or more of runtime computing systems 20, which may comprise one or more remote or cloud systems. The security models used and/or provided by risk analysis module 10 may, in some cases, incorporate design- and run-time evaluation from multiple sources, such as from agents/test modules 12. Using the techniques described herein, risk analysis module 10 is capable of determining whether other library and/or operating system API's of runtime computing systems 20 are being used securely (e.g., preventing intentional or accidental structured query language injection vectors, as one non-limiting example). In certain cases, the functionality of rule-based/machine learning engine 6 may be incorporated or included within that of risk analysis module 10.

As will be described further below, analysis computing system 2 may execute one or more of applications 4 to provide a software assurance tool that implement function- and/or API-hooking techniques (e.g., techniques to address GPU-assisted malware), showing analysis results in context within an overall risk model. The result may be a more cost effective and broad-scope software assurance that addresses modern software and hardware architectures.

Agents/test modules 12 may generally receive information associated with one or more applications that are executable on runtime computing systems 20, and agents/test modules 12 may, in some cases, receive monitoring information associated with execution of these one or more applications. For example, risk analysis module 10 may use function and/or API call stack data from runtime computing systems 20 (e.g., based on monitoring performed by agents/test modules 12 on runtime computing systems 20) as input to rule-based/machine learning engine 6 to discriminate normal, suspicious, and very likely malicious behavior of runtime computing systems 20. For example, based on the analysis or output of risk analysis module 10, a rule (e.g., rule implemented by an analyst or by risk analysis module 10) could identify a process that uses the GPU on runtime computing system 20A as a potentially malicious process if that process loads or is attempting to load a kernel module, given that typical processes using the GPU do not, in fact, load a kernel module. More sophisticated rules implemented by risk analysis module 10 can involve expected call stacks, where risk analysis module 10 may flag any unexpected sequence of calls or function call stacks during monitoring by agents/test modules 12 of one or more of runtime computing systems 20.

In addition to rules or policies that may be implemented by rule-based/machine learning engine 6, rule-based/machine learning engine 6 may also utilize one or more machine-learning models and/or machines (e.g., Classification and Regression Tree (CART) models and/or Support Vector Machines (SVM's)) to, e.g., "learn" what normal sequences of function or API calls are typical for software (e.g., GPU-assisted software) executing on runtime computing systems 20 (e.g., based on known benign and non-benign function call flows). Based on the known sequences of typical versus atypical call flows or sequences, rule-based/machine learning engine 6 may identify a respective likelihood of occurrence of each of one or more potential vulnerabilities. For instances, rule-based/machine learning engine 6 may then flag abnormal sequences or call stacks based on known or learned typical sequences/call stacks versus atypical sequences/call stacks. As one example, rule-based/machine learning engine 6 may flag an API call to start GPU-specific code in response to a network request that should not typically involve the GPU.

Applications 4 may provide functionality of an automated software assurance assessment tool that is capable of detecting threats in modern runtime systems, such as runtime computing systems 20. One or more of runtime computing systems 20 may include multi-core processors, distributed/cloud systems, and/or virtual machine hypervisors. In many cases, one or more of runtime computing systems 20 may provide a heterogeneous hardware environment that includes different types of hardware components (e.g., accelerators, processing units), such as GPU's and/or FPGA's. Applications 4 are configured to detect threats due to malware that is introduced on runtime computing systems 20, such as GPU-based or GPU-assisted malware. For example, applications 4 may utilize agents/test modules 12 to tracks all access to a particular GPU (e.g., a GPU included in runtime computing system 20A) by hooking the only available API's by which code can run on this GPU, and using risk analysis module 10 and/or rule-based/machine learning engine 6 to examine how the API's and GPU are being used.

In addition, applications 4 are configured to recognize threats that may arise due to the interaction of components in runtime computing systems 20, such as the unsafe use of API's or re-using benign libraries for malicious purposes. As noted above, agents/test modules 12 may receive data from runtime computing systems 20, which implement function and/or API hooking techniques, and provide such data to risk analysis module 10 for analysis in identifying potential issues related to malware (e.g., GPU-assisted malware). The function and/or API hooking techniques may apply directly to other library or framework API's of runtime computing systems 20. Through use of risk analysis module 10 and rule-based/machine learning engine 6, applications 4 also attempt to minimize the identification of false positives regarding potential risks or threats to runtime computing systems 20, while at the same time identifying potentially critical vulnerabilities or malicious code that is executing on runtime computing systems 20. Rule-based/machine learning engine 6 may, in various cases, apply multiple, weighted analysis techniques to raw data that is provided by agents/test modules 12 in response to the active monitoring of runtime computing systems 2. Furthermore, although source code for executables operating on runtime computing systems 20 may not always be available, applications 20 may utilize binary function-hooking technology, as well as system configuration tests, external probes, and others tools (e.g., tools provided by agents/test modules 12), as described further below.

Figure 2:
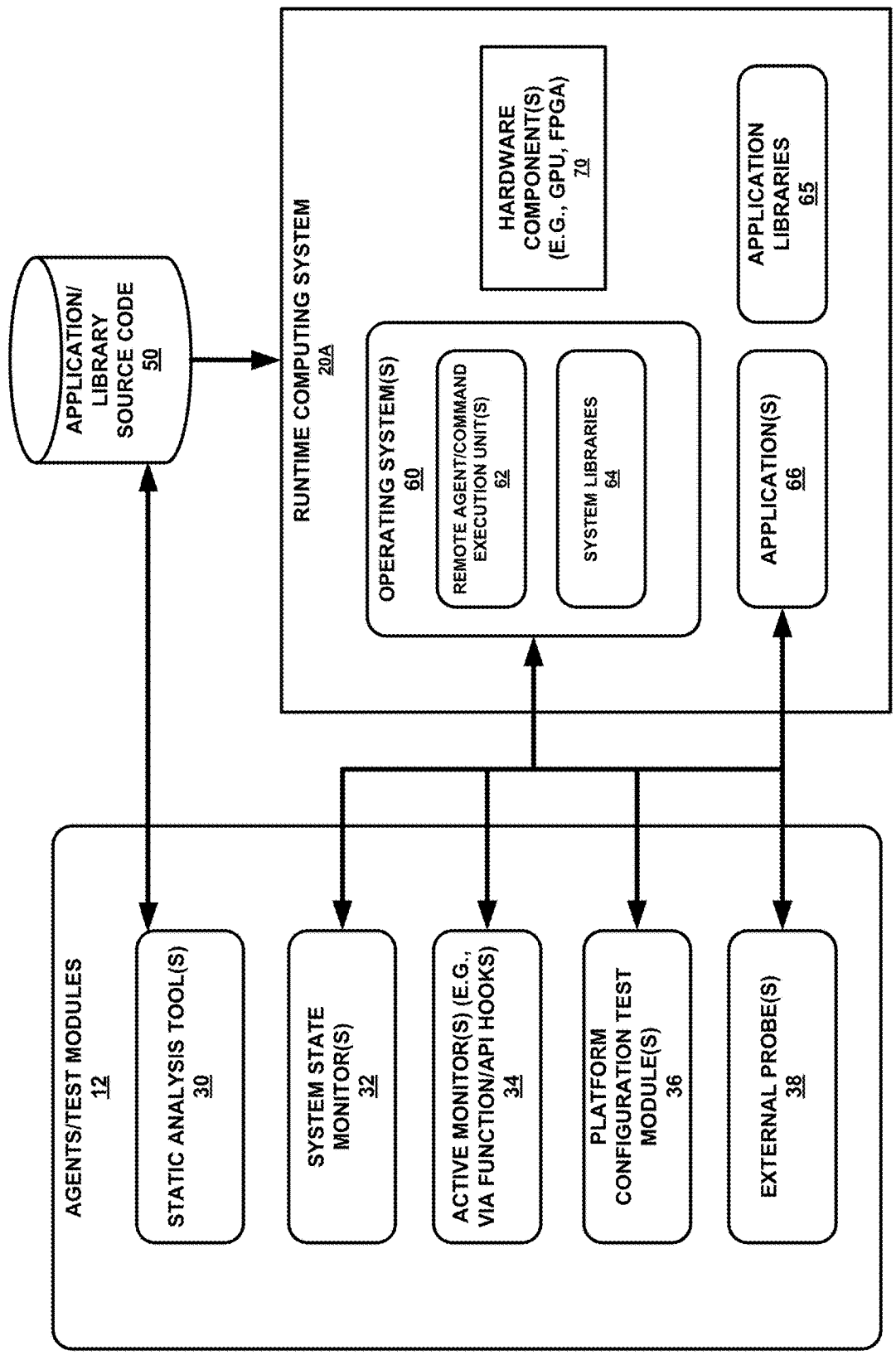
FIG. 2 is a block diagram illustrating one example of various components shown in FIG. 1, in accordance with one or more aspects of the present disclosure.

As noted previously, runtime computing systems 20 may comprise heterogeneous computing environments in which different types of hardware components are used, including non-central processing unit (CPU) accelerators such as GPU's and FPGA's. In many instances, malware or other malicious code may make use of such accelerators during operation. Applications 4 utilize agents/test modules 12 to perform both passive and active monitoring of runtime computing systems 20. For example, as shown in FIG. 2, agent/test modules 12 may include static analysis tools, system state monitors, active monitors, platform configuration test modules, and external probes. The static analysis tools are operable to analyze any available application or library source code for processes that are executable on runtime computing systems 20. The system state monitors are operable to perform monitoring or tests of system state information on runtime computing systems 20, such as information related to file system changes or particular programs that are or are not running on computing systems 20 at a particular point in time. These system state monitors typically monitor system-level state information, as opposed to information that is specific to a particular type of hardware component (e.g., hardware accelerator). In some cases, these system state monitors may invoke remote agents or commands that are executed on runtime computing systems 20. These remote agents or commands may, upon execution on runtime computing systems 20, provide system state information back to the system state monitors on analysis computing system 2. As one non-limiting example, the system state monitors may remotely collect such information from runtime computing systems 20 as outlined in U.S. Patent Application Publication No. 2012/0210427 by Bronner et al., published on Aug. 16, 2012 and entitled "Configurable Investigative Tool," which is incorporated by reference herein in its entirety.

The active monitors utilized by agents/test modules 12 may gather information from function and/or API hooking modules that are specific to particular functions and/or API's used during execution of instructions on runtime computing systems 20. These hooking modules or other active monitors are configured to obtain runtime information that is associated with instruction execution on runtime computing systems 20. As one example, the hooking modules may gather information associated with system memory, intercepted system calls, execution state, and/or stack traces that are associated with processes executing on runtime computing systems 20.

The platform configuration test modules included in agents/test modules 12 may identify configuration information associated with runtime computing systems 20. This configuration information may include security settings, user account information, or permission information associated with processes executing on runtime computing systems 20.

As shown in FIG. 1, applications 4 may also receive information from local knowledge base 16 and central knowledge base 18 using import/export module 14. Local knowledge base 16 may be local to, and stored on, analysis computing system 2. Central knowledge base 18 may be remote from, and stored external to, analysis computing system 2. Central knowledge base 18 may include information associated with common vulnerabilities to computing systems and/or known attacks that may be initiated against such systems. Much of the information included in central knowledge base 18 may include vendor- or community provided data, or standards-related data, which is continuously updated over time as more information becomes available.

In some instances, the information stored in central knowledge base 18 may also be stored or copied into local knowledge base 16 of analysis computing system 2 via import/export module 14. Local knowledge base 16 may also include policy information associated with rules as to which operations may or may not be performed by a given system, such as one or more of runtime computing systems 20.

Import/export module 14 may import the information contained in local knowledge base 16 and/or central knowledge base 18, and may provide such information to risk analysis module 10 for use in risk modeling and analysis operations. Risk analysis module 10 also utilizes the information provided by agents/test modules 12 based on the monitoring of runtime computing systems 20. Using the information provided by import/export module 14 and agents/test modules 12, risk analysis module 10 is capable of performing risk modeling and analysis operations to identify any potential vulnerabilities, risks, or malicious code (e.g., malware) associated with execution of processes in runtime computing systems 20. Risk analysis module 10 may utilize graphical user interface module 8 to provide a graphical representation of such vulnerabilities and risks within a graphical user interface that is output to a user (e.g., analyst). Based on the output provided by graphical user interface module 8, a user may determine what corrective or preventive actions to take in the software development process (e.g., modifying code or configuration information to mitigate or eliminate such vulnerabilities or risks).

In addition, risk analysis module 10 may utilize rule-based/machine learning engine 6 to identify trends of typical and atypical sequences of states or function/API calls (e.g., call flows) during process execution on runtime computing systems 20, such that risk analysis module 10 is capable of distinguishing benign from potentially malicious code that is executing on runtime computing systems 20. In such fashion, risk analysis module 10 is operable to identify potential vulnerabilities or risks that may be output for display by graphical user interface module. Import/export module 14 may also output information generated by risk analysis module 10 and/or rule-based/machine learning engine 6 for storage in local knowledge base 16 and/or central knowledge base 18 for later use by applications 4.

In some examples, analysis computing system 2 may use agents/test modules 12 to monitor execution of one or more applications on a runtime computing system, such as runtime computing system 20A. Runtime computing system 20A executes one or more applications and includes a plurality of processing units. The processing units are operable to perform one or more operations during execution of the one or more applications on runtime computing system 20A. In some cases, the processing units may include at least one GPU that is operable to perform at least one of the one or more operations.

During execution of the one or more applications on runtime computing system 20A, analysis computing system 2 uses agents/test modules 12 to receive, from runtime computing system 20A, monitoring information that includes at least one of function call data or API call data associated with operations performed by the processing units during execution of the one or more applications on runtime computing system 20A.

Analysis computing system 2 may then use risk analysis module 10 to import the monitoring information into a risk model, such as a hierarchical risk model described herein. Analysis computing system 2 uses risk analysis module 10 to analyze the monitoring information within the risk model to determine one or more potential vulnerabilities (e.g., risks, threats) and one or more potential impacts of the one or more potential vulnerabilities in the runtime computing system, where the one or more potential vulnerabilities are associated with execution of the one or more applications on runtime computing system 20A. For example, risk analysis module 10 may determine that potentially malicious code is executing on runtime computing system 20A that is enabled by the operation of the GPU. In some cases, risk analysis module 10 may utilize rule-based/machine learning engine 6 to assist with its analysis of the monitoring information and identification of possible vulnerabilities and vulnerability impacts, as described in further detail below.

Analysis computing system 2 may use graphical user interface module 8 to display, in a graphical user interface, a graphical representation of the one or more potential vulnerabilities and the one or more impacts within the risk model that are identified by risk analysis module 10. In some cases, the graphical representation may include corresponding scores or severities associated with the potential vulnerabilities and/or potential impacts, alerting a user as to which vulnerabilities and/or vulnerability impacts may be the most severe or complex. The disclosed techniques may enable a security analyst to discover vulnerabilities and potentially malicious code in a software system (e.g., a system that includes GPU-accelerated software), and determine the possible risks that such vulnerabilities pose to overall mission success. The disclosed techniques may also improve software assurance by providing more thorough analysis against the types of threats and runtime environments seen in modern computing architectures, providing an increased visibility to threats specific to code running on certain types of components (e.g., GPU's) in heterogeneous platforms or in a distributed/cloud environment. By providing alerts in context, the present techniques enable an analyst to prioritize important changes and see the impact of potential vulnerabilities or malicious code.

In FIG. 1, analysis computing system 2 and runtime computing systems 20 are shown are separate systems that are external from one another. In some examples, analysis computing system 2 may be included in or otherwise part of, one or more of runtime computing systems 20. In other words, the functionality described herein with respect to analysis computing system 2 may be included in or provided by one or more of runtime computing systems 20 (e.g., runtime computing system 20A, runtime computing system 20N).

FIG. 2 is a block diagram illustrating one example of various components shown in FIG. 1, in accordance with one or more aspects of the present disclosure. FIG. 2, for example, illustrates further example details of agents/test modules 12 and runtime computing system 20A shown in FIG. 1.

As illustrated in FIG. 2, runtime computing system 20A may include one or more operating systems 60, one or more applications 66, one or more application libraries 65, and one or more hardware components 70 (e.g., one or more GPU's, one or more FPGA's). Operating systems 60 includes one or more remote agent/command execution units 62 and one or more system libraries 64. Although shown as separate blocks in FIG. 2, applications 66 may, in some cases, be included in operating systems 60.

Agents/test modules 12, as illustrated in FIG. 2, may include one or more static analysis tools 30, one or more system state monitors 32, one or more active monitors (e.g., function and/or API hooks), one or more platform configuration test modules 36, and one or more external probes 38. Agents/test modules 12 are part of analysis computing system 2. As described earlier, analysis computing system 2 may monitor execution of applications 66 on runtime computing system 20A.

Static analysis tools 30 are capable of performing static analyses of any source code, including script or other forms of source code, which is compiled or otherwise processed/interpreted for execution of operating systems 60 (including remote agent/command execution units 62 and system libraries 64), and/or execution of applications 66 of runtime computing system 20A. In some cases, source code may be unavailable, in which case static analysis tools 30 may not be used or implemented. However, in other cases, such as illustrated in the example of FIG. 2, application and/or library source code 50 may be available for analysis by static analysis tools 30. In certain examples, as noted further below, application/library source code 50 may include Open Computing Language (OpenCL) code. In the example of FIG. 2, static analysis tools 30 may analyze application/library source code 50 that is compiled or otherwise processed for execution of system libraries 64, application libraries 65, and/or applications 66. Static analysis tools 30 may analyze code 50 based on one or more rules to identify, for instance, potentially malicious, unusual, or unexpected function calls or sequences of instructions that may cause risks or other vulnerabilities to runtime computing system during use of system libraries 64, application libraries 65, and/or execution of applications 66. Static analysis tools 30 may provide analysis results to risk analysis module 10 (FIG. 1) for further processing, as described further below.

System state monitors 32 may perform monitoring of operating systems 60 and/or applications 66. In some cases, system state monitors may perform one or more system state tests to obtain test result or monitoring information from operating systems 60 and/or applications 66. As one example, system state monitors 32 may monitor any changes to file systems used by operating systems 60 and/or applications 66, and may also, in some cases, determine which programs or processes are executing at a given time. In some instances, system state monitors 32 may invoke or otherwise utilize remote agent/command execution units 62 in runtime computing system 20A. Remote agent/command execution units 62 are operable to perform certain actions on runtime computing system 20A and provide corresponding results or other information (e.g., changes to file systems, information about which programs are executing) back to system state monitors 32 of analysis computing system 2. System state monitors 32 may provide monitoring information to risk analysis module 10 (FIG. 1) for further processing.

Figure 3:
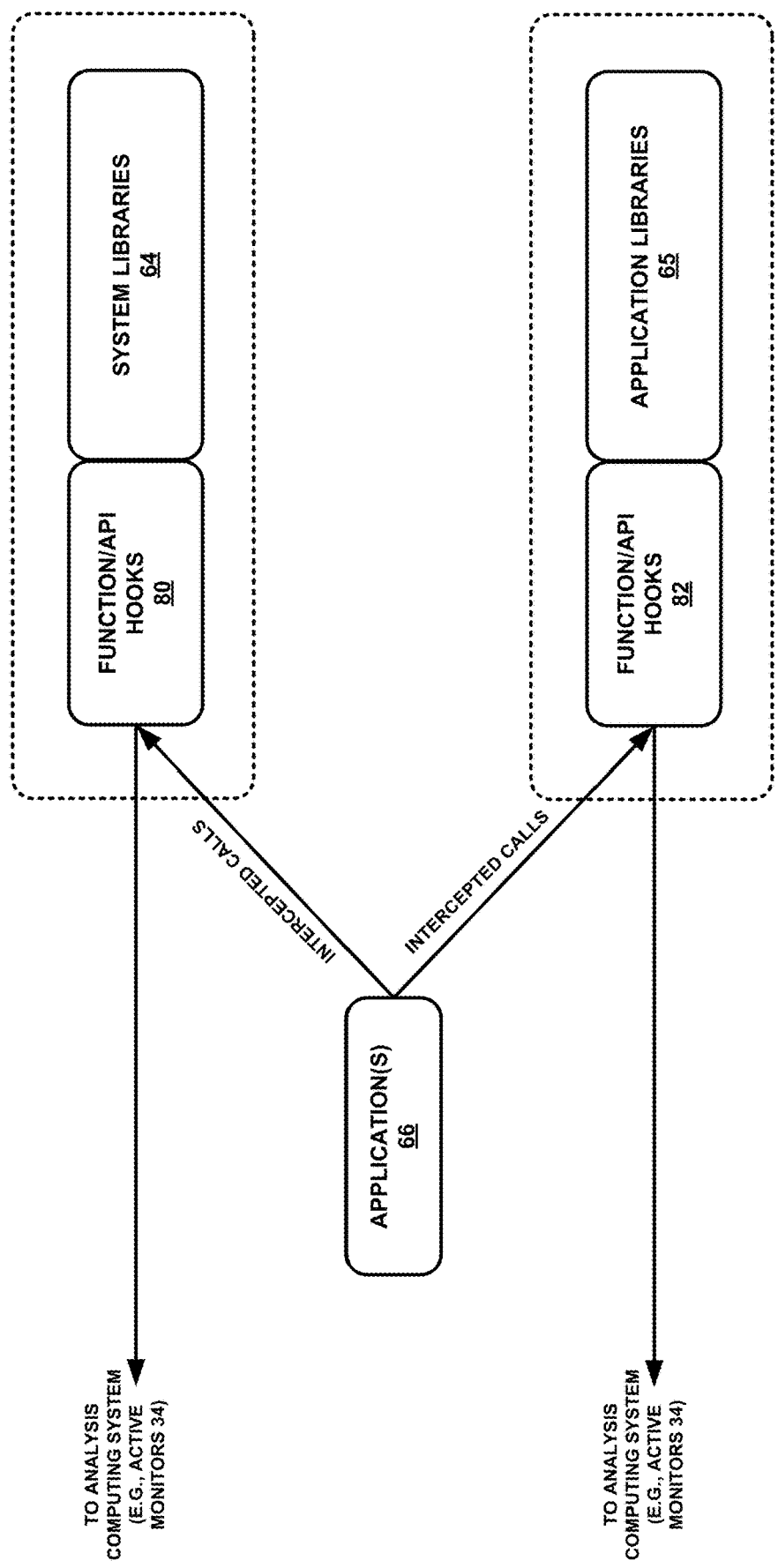
FIG. 3 is a conceptual diagram illustrating example function and/or application programming interface (API) hooks, in accordance with one or more aspects of the present disclosure.

Active monitors 34 may perform active monitoring of runtime computing system 20A during execution of applications 66. In some examples, active monitors 34 may make use of function and/or API hooks that are implemented in runtime computing system 20A. In these examples, as further illustrated in FIG. 3, runtime computing system 20A may provide wrappers or instrumented code for function and/or API calls that are invoked by applications 66 during execution. FIG. 3 is a conceptual diagram illustrating example function and/or application programming interface (API) hooks, in accordance with one or more aspects of the present disclosure. In the example of FIG. 3, function and/or API hooks 80 may provide wrappers or instrumented code for corresponding function and/or API calls to system libraries 54 that are invoked by applications 66 during execution. Similarly, function and/or API hooks 82 may provide wrappers or instrumented code for corresponding function and/or API calls to application libraries 65 that are invoked by applications 66 during execution. In some examples, function/API hooks 80, 82 may serve as respective wrappers to system libraries 54 and application libraries 65. In some examples, function/API hooks 80, 82 may be respectively included within system libraries 54 and application libraries 65.

When applications 66 invoke function and/or API calls that are intercepted by function/API hooks 80 and/or 82, the wrappers or instrumented code intercept such calls and are capable of performing other analysis or monitoring functions, such as reporting the entire call stack and/or arguments for selected functions within a binary, system libraries 64, application libraries 65, or operating system 60. For example, file wrappers or instrumented code provided by function/API hooks 80, 82 that is implemented on runtime computing system 20A for select function and/or API calls invoked by applications 66 may log information to a log file, such as one or more of the functions or API's being invoked and the arguments (possible including the contents of any file handles or other nested structures), a return status (e.g., whether the call succeeded), values of any passed-by-reference structures after the call completes, any access tokens, the program counter of the caller (e.g., one of applications 66), and/or the program counter of the last call from an application instance (e.g., one of applications 66). The wrappers or instrumented code provided by function/API hooks 80, 82 may store such information for each invocation of a particular function call (e.g., call to operating systems 60, application libraries 65, and/or system libraries 64) or an API by applications 66. Through the use of such wrappers or instrumented code, potentially important or critical operating system function calls or other API calls invoked by applications 66 may be used by active monitors 34 to detect usage patterns and examine the function call stack of each function or API call.

In some cases, the wrappers or instrumented code may provide monitoring information back to analysis computing system 2 (e.g., to active monitors 34), such as function call data or API call data corresponding to the function or API calls intercepts by function/API hooks 80, 82 In some cases, remote agent/command execution units 62 may provide such monitoring information to active monitors 34 (e.g., from log files stored on runtime computing system 20A). In such fashion, active monitors 34 may, along with the use of monitoring information provided to risk analysis module 10, attempt to address and identify the threats or vulnerabilities posed by, e.g., GPU-assisted malware and other heterogeneous hardware runtimes provided by runtime computing system 20A.

In order for malicious software in one or more of applications 66 to use of one or more of hardware components 70, such as a GPU, the software may, in certain instances, make requests through operating system or application API's (e.g., API's of system libraries 64, API's of application libraries 65) that give appropriate access to the hardware components. The OpenCL API, for instance, defines ways in which software may access a GPU as an abstracted acceleration device. OpenCL uses the Low Level Virtual Machine (LLVM) compiler toolchain's Intermediate Representation (IR) and generates hardware-specific (e.g., GPU-specific) code at runtime, depending on which one or more of hardware components 70 execute the hardware-specific code. (In certain examples, static analysis tools 30 may be operable to perform analysis of such In cases where hardware components 70 include a GPU, GPU-assisted malicious code executed by applications 66 may often use both function calls to operating systems 60 (e.g., API's to system libraries 64) and/or application API's (e.g., API's to application libraries 65, such as OpenCL API's) in order to have an external effect. As one non-limiting example, a memory management API of the operating system (e.g., in system libraries 64) is often used to map memory into sections that are visible to a graphics card. It is this type of example process that GPU-assisted malicious code executing in applications 66, such as keyloggers or decryptors, use to make data visible to the GPU.

Thus, active monitors 34 may, in various examples, receive monitoring information from runtime computing system 20A based on the application of function/API hooks 80 into system libraries 64 (e.g., hooks for operating system function calls) and/or function/API hooks 82 into application libraries 65 (e.g., hooks for OpenCL API calls). Through the processing of such information, analysis computing system 2 may utilize risk analysis module 10 to identify potentially risk or malicious code executing in applications 66 of runtime computing system 20A (e.g., GPU-assisted malicious code), or other potential vulnerabilities in the execution of applications 66. In certain non-limiting examples, runtime computing system 20A may provide hooking via function/API hooks 80 of low-level kernel calls into system libraries 64 (e.g., via Windows's ntdll.dll gateway library) for loading new kernel modules and other highly security-sensitive operations. In these non-limiting examples, hooks into a library such as this may catch code using high-level API's such as CreateService( ) as well as their underlying implementations: ZwLoadDriver( )and ZwUnloadDriver( ).

As shown in FIG, 2, agents/test modules 12 may also include platform configuration test modules 36. As noted earlier, platform configuration test modules 36 included in agents/test modules 12 may identify configuration information associated with runtime computing system 20A. This configuration information may include security settings, user account information, permission information, or other type of configuration information associated with applications 66 or runtime computing system 20A in general.

External probes 38 comprise one or more probes that interact with one or more external interfaces of runtime computing system 20A, For example, if runtime computing system 20A is a web server, external probe 38 may include a command-line tool (e.g., "wget") that performs web-requests on runtime computing system 20A. Other non-limiting examples of external probes 38 may include a network probe tool, a nmap tool, or a tool to connect to runtime computing system 20A (e.g., secure shell server) to determine the version of computing system 20A.

Figure 4:
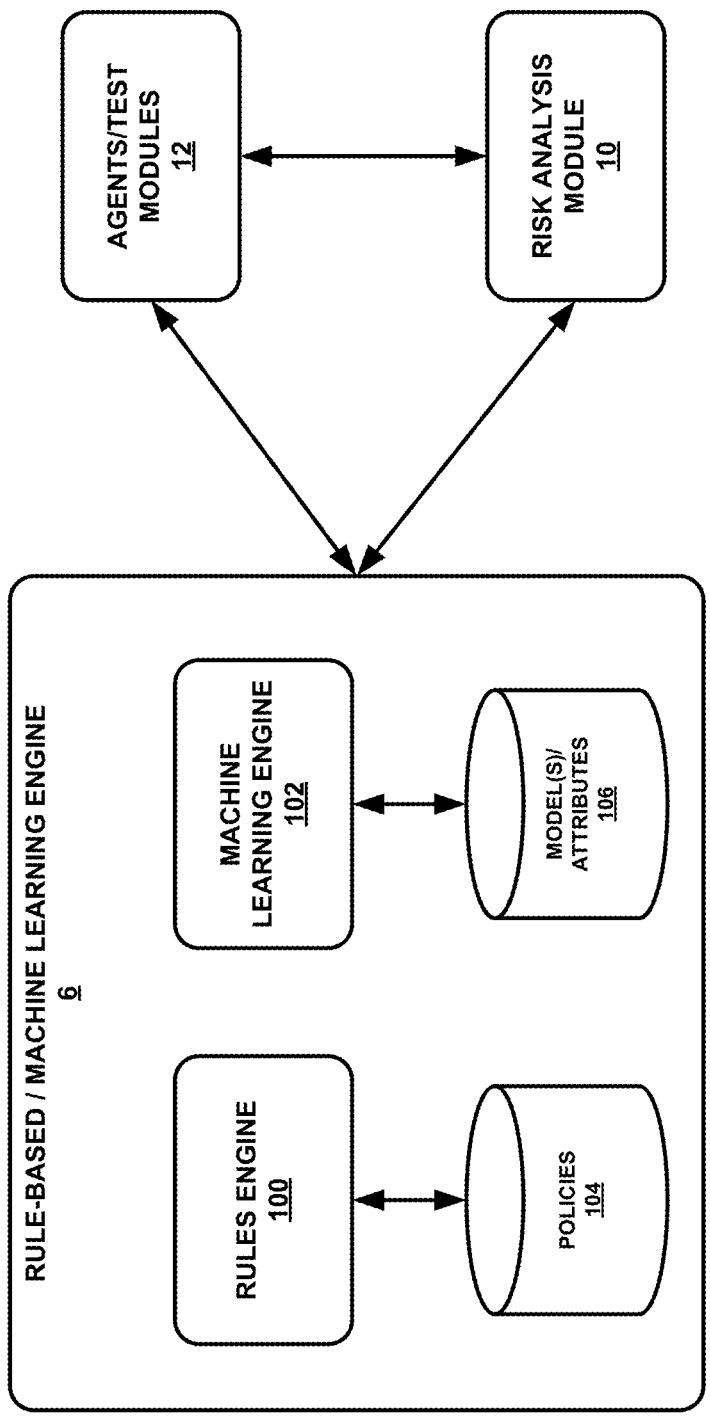
FIG. 4 is a block diagram illustrating further details of one example of the rule-based/machine learning engine shown in FIG. 1, in accordance with one or more aspects of the present disclosure.

FIG. 4 is a block diagram illustrating further details of rule-based/machine learning engine 6 shown in FIG. 1. As shown in FIG. 4, rule-based/machine learning engine 6 interacts with agents/test modules 12 and risk analysis module 10. As previously described in reference to FIG. 1, in some examples, rule-based/machine learning engine 6 may be part of or otherwise included in risk analysis module 10.

Upon use of agents/test modules 12 during execution of applications 66 on runtime computing system 20A, agents/test modules 12 may provide monitoring information or test results to risk analysis module 10 and/or rule-based/machine learning engine 6 for further processing and analysis. Risk analysis module 10 may attempt to detect potentially suspicious activity by processing the information provided by agents/test modules 12, utilizing rule-based/machine learning engine 6.

As shown in the example of FIG. 4, rule-based/machine learning engine 6 includes rules engine 100 and machine learning engine 102. Rules engine 100 utilizes one or more policies 104, and machine learning engine 102 utilizes one or more models 106. Risk analysis module 10 and rule-based/machine learning engine 6 may apply a hybrid approach of rules combined with machine-learning to discover vulnerabilities associated with execution of applications 66 on runtime computing system 20A, such as unanticipated or potentially malicious program flows.

Rules engine 100 may use policies 104 to analyze information provided by agents/test modules 12. Through such analysis, rules engine 100 may identify possible vulnerabilities, or triggers, associated with very likely malicious activity that has little likely value in legitimate code in applications 66. For example, based on execution of applications 66 and monitoring information provided by agents/test modules 12 (e.g., information provided via function hooks or instrumented code on runtime computing system 20A), rules engine 100 may determine that loading a kernel driver as well as starting GPU-accelerated code within the same process, during execution of applications 66, is suspect because those two functions are typically not used in the same computational process. Similarly, rules engine 100 may determine that certain sets of arguments to OpenCL, and/or operating system calls, as provided via function hooks or instrumented code, can be flagged as creating specific vulnerabilities, even if not intentionally malicious. In various examples, rules engine 100 may flag such instances as warnings.

Policies 104 used by rules engine 100 may provide various rules and corresponding weights and/or thresholds. Rules engine 100 may process monitoring information provided by agents/test modules 12, using policies 104, where corresponding weights or thresholds of rules may be associated with likelihoods of possible vulnerabilities, or triggers (e.g., triggers of malicious activity), based execution of applications 66.

In addition to rules engine 100, rule-based/machine learning engine 6 may also use machine learning engine 102. If rules engine 100 does not trigger or identify any alerts or warnings associated with vulnerabilities, machine learning engine 102 may also analyze the monitoring information from agents/test modules 12. Machine learning engine 102. may use one or more models/attributes 106. As non-limiting examples, models/attributes 106 may include Classification and Regression Tree (CART) and/or Support Vector Machine (SVM) models. Through the use of models/attributes 106, machine learning engine 102 may discern the likelihood of occurrence for malicious code based on a set of known good/bad training examples. In some cases, in order to avoid an extremely large number of attributes as inputs for models/attributes 106, machine learning engine 102 may pre-filter by selecting certain attributes (e.g., certain API call arguments or parents on a call stack) that are discriminatory between malicious and legitimate code. In some examples, CART models may be used when the source data's attributes fall into "bins", such as a C enum or a set of flags as a function call parameter. In some examples, SVM models may be used when attributes are continuous values, such as an integer value for a buffer size.

Once rules engine 100 and/or machine learning engine 102 has initially processed the monitoring information provided by agents/test modules 12, the results may be combined with relative weights in an effort to minimize fake alarms. For instance, a given rule in policies 104 can have a weight corresponding to its likelihood of flagging malicious behavior. This weight can be compared to a corresponding "confidence value" produced by one or more of models in models/attributes 106 (e.g., in an SVM model) for the same data.

Figure 6:
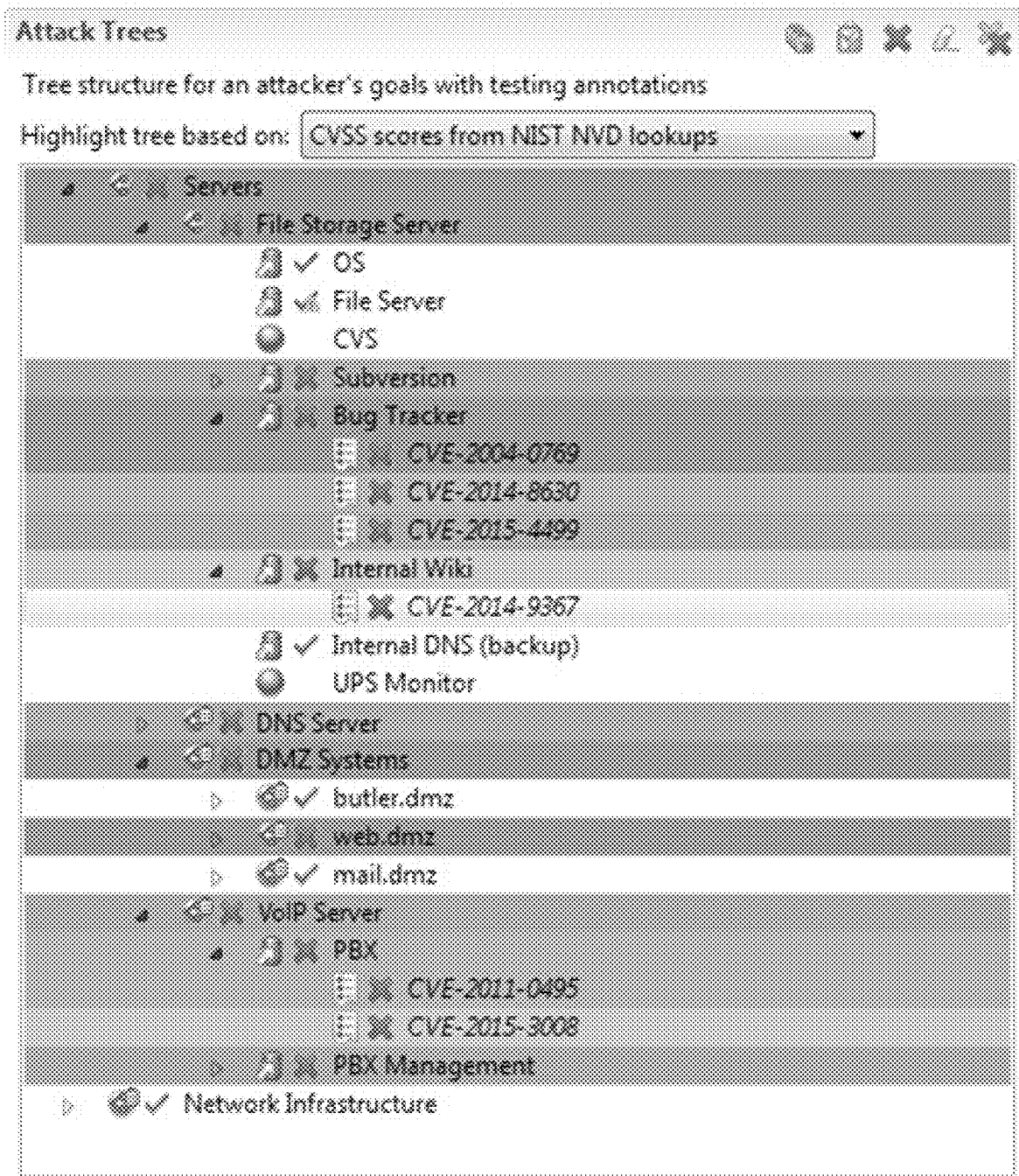

FIGS. 5-7 are screen diagrams illustrating example information included in a risk model that may be output for display, in accordance with one or more aspects of the present disclosure. The analyses performed by risk analysis module 10 and rule-based/machine learning engine 6 may be integrated into a risk model, such as a risk model represented in one or more of FIGS. 5-7, which is output for display by graphical user interface module 8, in order to provide a graphical representation of potential vulnerabilities within context of execution of applications executing on runtime computing systems 20. In various examples, the risk model may comprise a hierarchical risk model that represents a tree (e.g., an attack tree). In these examples, the results from rule-based/machine learning engine 6, as well as the structure of the risk model used by risk analysis module 10, may be stored in a particular format, such as an eXtensible Markup Language (EVIL) format. Such a file format is extensible and allows for the addition of arbitrary computed attributes and other data to be stored with each node in the model.

The hierarchical risk modeling and automated evaluation technologies may be provided by risk analysis module 10. In various non-limiting examples, risk analysis module 10 may model risks using a version of attack trees, which are created to support systematic investigation of attack modalities. In some other non-limiting examples, risk analysis module 10 may use constructive tree models. Constructive trees show how various important/desirable properties represented in the trees are maintained. These models then breaks down each property into sub-properties that must all be maintained (e.g., for conjunctive nodes) or one of which may be maintained (e.g., for disjunctive nodes).

In examples where risk analysis module 10 uses attack trees, the attack trees may represent an attack (e.g., benign or malicious attack) that is performed on a runtime computing system (e.g., runtime computing system 20A) during execution of one or more applications (e.g., applications 66) on that system. A top-level attack goal, such as modifying stored data, is represented at the root node of such an attack tree. Each level below the root node may comprise various sub-nodes (or leaf nodes), and each sub-node may have one or more further respective sub-nodes. Each sub-node represents an attack sub-goal of goal that is represented by its respective root or parent node. In the particular example above, where the top-level attack goal is represented in the attack tree as modifying stored data of runtime computing system 20A during execution of applications 66, the attack sub-goals, represented by the sub-nodes of the root node of the attack tree, may be modifying the data during computation or modifying the data in storage.

For instance, as shown in the example of FIG. 5, an illustrated attack tree represents a tree structure for an attacker's goals and methods with respect to one or more attacks against a runtime computing system, such as runtime computing system 20A. The attack tree, illustrated in area 120 of the graphical user interface of FIG. 5, may include five distinct higher-level nodes that each represent a respective higher-level goal of an attack. In sonic cases, the five higher-level nodes may each comprise a top-level node (e.g., root nodes), but in other cases, they may represent sub-nodes of an even higher-level root node representing a highest-level goal of the attack (not shown).

The five higher-level nodes in the attack tree of FIG. 5 represent the following five higher-level attack goals: breach confidentiality of the runtime system, compromise integrity of the runtime system, reduce availability of the runtime system, misuse services of the runtime system, and force compliance or increase liability with respect to the runtime system. In addition, FIG. 5 illustrates examples sub-goals of certain ones of these higher-level goals. For example, the node of the attack tree representing the goal of breaching confidentiality has four sub-nodes that represent the following respective sub-goals: read private information in transit, read private data at rest or a specific computer or device, convince a human to directly reveal private information, and deduce private data be reading public data. In addition, the node of the attack tree representing the goal of compromising integrity has three sub-nodes that represent the following respective sub-goals: modify private information in transit, modify private data at rest on a specific computer or device, and convince a human to directly modify private information. As shown, the higher-level goals may share one or more common sub-goals, which may, in some examples, be represented by common sub-nodes in the overall attack tree.

Sub-goals may be disjunctive (e.g., one of the sub-goals must be met) or conjunctive (e.g., all sub-goals must be met) in order for the parent goal (e.g., top-level attack goal) to be satisfied. In some cases, other criteria with respect to the sub-goals must be satisfied in order for the parent goal to be satisfied. For example, depending on the criteria, the parent goal may be satisfied if none of the sub-goals are met, if at least two of the sub-goals are met, or if all of the sub-goals are met in a particular (e.g., chronological) order, to name only a few examples.

Leaf sub-goals are those that might be met because of a vulnerability in the system. For example, an attacker might insert a known-weak encryption algorithm, allowing an adversary to easily decode encrypted data in transit. Therefore, the attack tree represents how vulnerabilities (e.g., vulnerabilities based on execution of malware) can be exploited to achieve the attacker's possible aims on a runtime computing system (e.g., runtime computing system 20A).

As further shown in the non-limiting example of FIG. 5, the graphical user interface, in addition to displaying the details of the attack tree, may also display additional details, as shown on the right-hand side of the graphical user interface, in area 122 of FIG. 5. For example, various additional goal details may be provided for any of the nodes in the attack tree. In FIG. 5, the user has selected the sub-node (or leaf node) representing the sub-goal of convincing a human to directly reveal private information, which occurs under the parent node representing the goal to breach confidentiality. This selected sub-node is highlighted in the attack tree in area 120 of FIG. 5. On the right-hand side of FIG. 5, the name of this sub-goal is shown, and any available and additional description or documentation may be provided with respect to the selected goal, although none are shown in the example of FIG. 5.

The graphical user interface may also include further details regarding testing procedures that may be performed in the portion of area 122 labeled "Testing Procedures," although none are shown in the example of FIG. 5. These testing procedures may include procedures for determining or evaluating whether the particular goal or sub-goal of the attack has been prevented. The passing of tests that are included in the testing procedure may indicate that the respective goal or sub-goal of the attack cannot take place. In certain examples, the tests included in these testing procedures may include one or more tests that are initiated by agents/test modules 12 of analysis computing system 2 when obtaining monitoring information from one or more of runtime computing systems 20.

The graphical user interface may also include further details regarding attributes and computed values in the portion of area 122 in FIG. 5 labelled "Attributes and Computed Values." The attributes and computed values may include data, such as fixed or dynamic values, associated with the respective goal or sub-goal. In the particular example of FIG. 5, the two values shown relate to remediation and attack costs. The attack cost may be associated with the attacker's cost based on test results, and the remediation cost may be associated with any remediation costs for fixing one or more items based on unsuccessful attempts to prevent an attack. Thus, one or more of the values shown in this portion of the graphical user interface may be related to costs for remediating or fixing issues that arise due to attacks or associated vulnerabilities.

Risk analysis module 10 is configured to perform automated evaluations and computations on the attack trees, testing on-line to see whether particular vulnerabilities are present, and/or whether known weak configurations or libraries are in use (e.g., in system libraries 64 and/or application libraries 65). Risk analysis module 10 may compute metrics and/or costs based on component metrics. Risk analysis module 10 may analyze monitoring information provided by agents/test modules 12, which may include test results, and may also, in some cases, utilize information provided by local knowledge base 16 and/or central knowledge base 18. For example, central knowledge base 18 may include information about known or common vulnerabilities and exposures. The results of the analyses may be summarized, for example, in a dashboard that is output for display by graphical user interface module 8, which enables a user to identify and even potentially pinpoint critical risks and potentially cost-effective means to address them, In various examples, the structure of an attacker's methodologies is implicit in the attack tree model used by risk analysis module 10, allowing severity or complexity information reported by individual ones of agents/test modules 12, or for individual components, to appropriately bubble-up to top-level software assurance goals.

In the risk model output via graphical user interface module 8, risk analysis module 10 may compute aggregate risks or other statistics for one or more of the potential vulnerabilities. In certain examples, the risk model may identify potentially cost-effective places within the model (e.g., attack tree) to address such potential vulnerabilities. For instance, if an analyst assigned costs to fix or re-implement various components (e.g., components of runtime computing system 20A, such as applications 66), the risk model may help identify or potentially pinpoint the most cost-effective places to address such vulnerabilities (e.g., in applications 66, system libraries 64, application libraries 65) given the test results.

One non-limiting example of a dashboard that shows graphical representations of potential vulnerabilities and associated scores within a hierarchical risk model is shown in FIG. 6. In this example, a version of a tree (e.g., attack tree) having a particular tree structure for an attacker's goals with testing annotations is illustrated, where higher-level or root nodes may be associated with respective higher- or top-level or root operations (e.g., goals) associated with "Servers" and "Network Infrastructure." The lower-level sub-nodes (or leaf nodes) of the higher-level server node are associated with lower-level operations or sub-operations (e.g., sub-goals) associated with "File Storage Server," "DNS Server," "DMZ Systems," and "VoIP Server." The higher-level operations and lower-level (or sub-) operations may be associated with execution of applications on a runtime computing system (e.g., runtime computing system 20A). A user may select any given node within the tree to expand or collapse the view. For example, the user may select the "Servers" node to obtain an expanded view of the respective sub-nodes.

The tree may be highlighted or shaded based on scores that are calculated using the Common Vulnerability Scoring System (CVSS), which is a widely adopted system that is used for assigning numerical scores for potential vulnerabilities in a system based on relative severity. In the example of FIG. 6, the CVSS scores are based on lookups from the National Vulnerability Database (NVD) from the National Institute of Standards and Technology (NIST). Various information from the NVD, including information associated with Common Vulnerability and Exposure (CVE) lists or identifiers, may be accessible analysis computing system 2 (e.g., via central knowledge base 18).

Nodes that are highlighted in the tree or otherwise graphically emphasized (e.g., having an "X" symbol located to the left of the text in a respective row, and/or otherwise highlighted) are nodes that may have corresponding, potential vulnerabilities identified with respect to a runtime computing system, such as runtime computing system 20A. Nodes that are not highlighted, or which have a checkmark symbol located to the left of the text in a respective row, do not have any associated vulnerability. In the example of FIG. 6, a high-level vulnerability has been identified for "Servers," and the following sub-level nodes also have associated vulnerabilities that are identified: "File Storage Server," "DNS Server," "DMZ Systems," and "VoIP Server." Any individual sub-level node may also include further lower-level nodes having vulnerabilities within the tree. For example, as shown in FIG. 6, the node "File Storage Server" may also include the following lower-level nodes with identified vulnerabilities: "Subversion," "Bug Tracker," and "Internal Wiki." In some examples, each vulnerability within the tree may be associated with particular failed tests that caused the respective vulnerability. In some examples, a sub-node in the tree that is associated with a respective vulnerability may have one or more further sub-nodes that represent respective vulnerabilities (e.g., CVE identifiers). For example, as shown in FIG. 6, the sub-node "Bug Tracker" has further sub-nodes that identify the following specific vulnerabilities associated with "Bug Tracker": "CVE-2004-0769," "CVE-2014-8630," and "CVE-2015-4499." In such fashion, vulnerabilities may be represented in context within the tree, such that a user may more fully understand how the vulnerabilities fit in within the nodes (e.g., operations, goals) of the tree, along with the respective scores or severities of such vulnerabilities.

In the particular example of FIG. 6, the scores that may be assigned to potential vulnerabilities represented in the tree structure may be CVSS scores within the range of zero through ten, with a score of ten being associated with the most severe vulnerability. Each vulnerability, in certain examples, may comprise one of the CVE's from the list, having a particular identifier for the corresponding vulnerability. Any given CVSS score may, in various examples, be further broken down into the following vectors: (a) access complexity vector, which is a qualitative measure of the complexity of the attack; (b) access vector, which indicates whether an adversary can complete the attack from a network (e.g., the Internet), whether the attacker must be on the same local network as the runtime computing system, or whether the attacker must have already gained access to the runtime computing system by other means; (c) authentication required vector, which indicates the number of authentication credentials required to complete the attack (e.g., none, one, or multiple); (d) confidentiality impact vector, which indicates the qualitative impact on information confidentiality (e.g., complete, partial, or none); (e) integrity impact vector, which indicates the qualitative impact on information integrity (e.g., complete, partial, or none); and (f) availability impact vector, which indicates the qualitative impact on information availability (e.g., complete, partial, or none). Each vulnerability or CVE included in the tree structure may have a respective value for each of these vectors.

As noted above, the vulnerabilities that are highlighted or graphically emphasized have associated CVSS scores. In some examples, nodes with associated vulnerabilities having lower or less severe scores (e.g., scores in the range of 0.1 to 4.0) may be highlighted in a first color, such as yellow. Nodes with associated vulnerabilities having higher or more severe scores (e.g., scores in the range of 4.1 to 8.0) may be highlighted in a second color, such as orange. Nodes with associated vulnerabilities having scores that are extremely high or severe (e.g., in the range of 8.1 to 10.0) may be highlighted in a third color, such as red, to identify these vulnerabilities as the most critical to the operation of the system. A user may attempt to address the vulnerabilities in an order corresponding to the level of severity of such vulnerabilities, which may be quickly and easily identified from the tree. By analyzing the tree (e.g., in the graphical dashboard format shown in FIG. 6), a user is able to identify all potential vulnerabilities within a hierarchical format and context, such that the user may be able to understand the various risks to the operation of the runtime computing system, at both high and low levels, and may further obtain a better understanding as to how and prioritize corrective and/or preventive actions to mitigate the identified vulnerabilities.

A user may also select any of the vulnerabilities represented in FIG. 6 to obtain further details of the tests that are associated with the respective vulnerability. For each, the user may select the vulnerability of FIG. 6 named "CVE-2014-9367" to obtain further details of the test details that led to this vulnerability, which are shown in FIG. 7. The test details may indicate which test or tests were run, the time of test execution, and the overall test results (e.g., a failure of the tests, indicating that requirements were not met and that an attack is possible to cause the vulnerability, as shown in area 126 of FIG. 7). The test details may also include the exact CVSS score (e.g., score of 4.3) and the associated attributes and computed values (e.g., data and fixed or dynamic values for the goal that is associated with this vulnerability), broken down into the vector values described above (as illustrated in area 124 of FIG. 7), which may be determined based on analysis of the information collected within the risk model. For instance, the test details may indicate an "access vector" value of "network," an "access complexity" value of "medium", an "authentication required" value of "none," a "confidentiality impact" value of "none," an "integrity impact" value of "partial," and an "availability impact" value of "none."

Thus, for the vulnerability named "CVE-2014-9367," the detailed information shown in area 124 provides the CVSS score, a value associated with the access vector, a value associated the access complexity vector, a value associated with the authentication required vector, a value associated with the confidentiality impact vector, a value associated with the integrity impact vector, and a value associated with the availability impact vector. The value associated with the confidentiality impact vector indicates a qualitative impact on information confidentiality for the vulnerability named "CU-2014-9367" shown in the attack tree of FIG. 6. The value associated with the integrity impact vector indicates the qualitative impact on information integrity for this vulnerability. In addition, the value associated with the availability impact vector indicates the qualitative impact on information availability for the vulnerability. By analyzing the collected information in the risk model, analysis computing system 2 is enabled to determine one or more potential vulnerabilities (e.g., the vulnerability named "CVE-2014-9367) and one or more potential impacts (e.g., values associated with the confidentiality impact vector, the integrity impact vector, and the availability impact vector) of these vulnerabilities in a runtime computing system.

Figure 8:
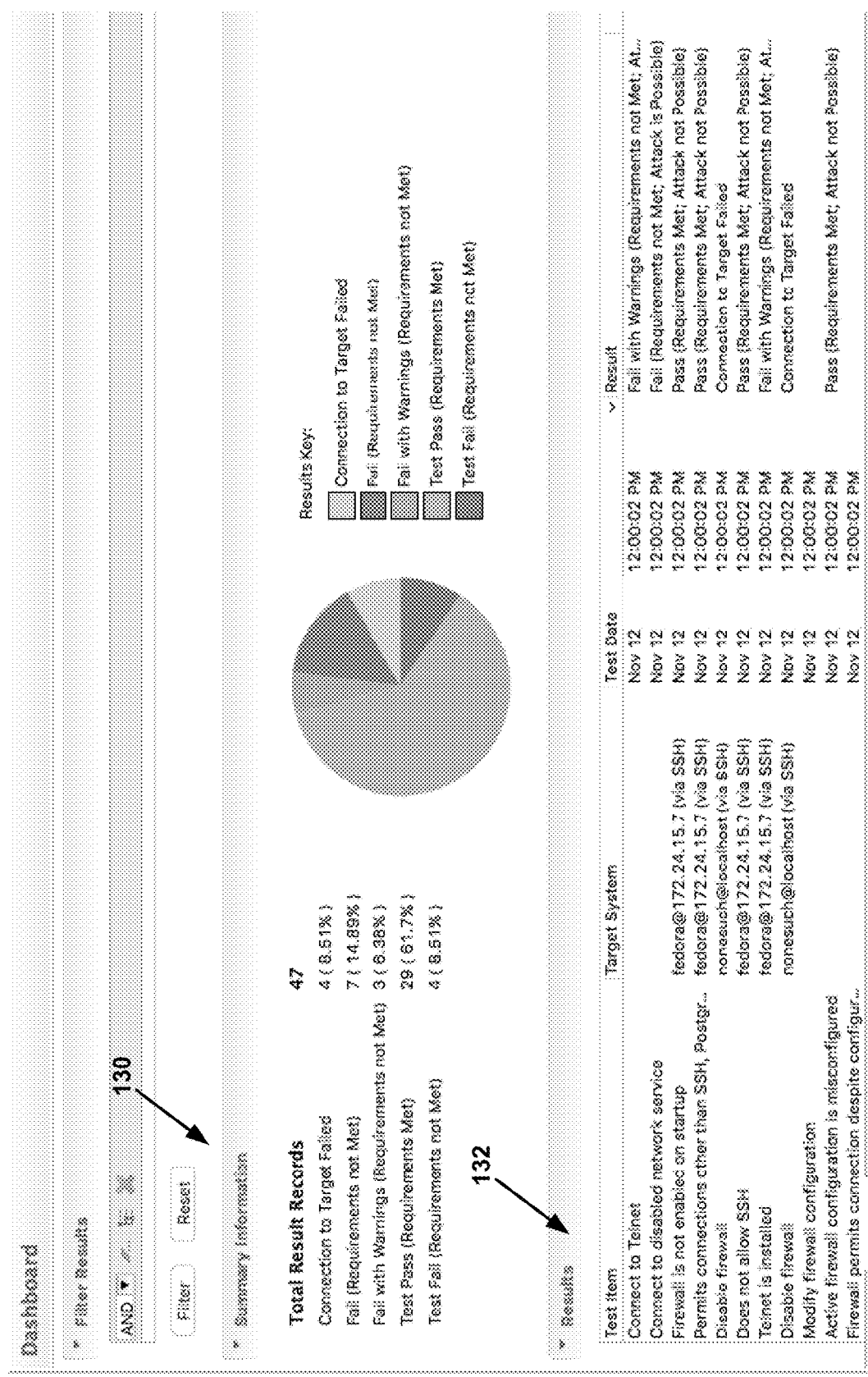

FIG. 8 is another screen diagram illustrating an example of a dashboard that may be displayed in the graphical user interface to provide summary information to the user regarding test results and potential vulnerabilities to the system. Overall summary information may be included in area 130 of the graphical user interface. The summary information may include the total result records of all tests that have been performed (e.g., by agents/test modules 12), both in numerical and chart (e.g., pie-chart) form. These results may indicate, for example, the number of tests in which the connection to the target (e.g., runtime computing system 20A) failed, the number of tests that failed (such that requirements of the test were not met), the number of tests that failed with warnings (such that the requirements of the test were not met), the number of tests that passed (such that requirements of the test were met and another category of tests that failed (such that requirements were not met). For various scenarios or instances in which there was a failure, risk analysis module 10 may utilize the hierarchical model (e.g., attack tree) to identify one or more operations or sub-operations in a tree module (e.g., goals or sub-goals in an attack tree) that may be achieved in view of the failure, and to identify any corresponding vulnerabilities and associated scores in view of the failure, which may be output to the user as a group of graphical representations of such vulnerabilities (e.g., such as in the dashboard of FIG. 6).

Area 132 of the graphical user interface provides more specific tests results. Each of the test results includes a description of a test item, a name of the target system associated with the test (e.g., one of runtime computing systems 20), the test date, and the test results. Each of the test items may be associated with one or more of the operations or sub-operations (e.g., goals or sub-goals) in the hierarchical risk model (e.g., attack tree shown in FIG. 5 and/or FIG. 6), and may also be associated with one or more potential vulnerabilities in the model (e.g., vulnerabilities shown in FIG. 6) when the corresponding test results indicate a failure. As shown in the results column, test failures may cause the results to indicate that an attack is possible, alerting the user to possible issues with the target system(s). In some cases, the user may select one of the test items or results in area 132 to cause the graphical user interface to display or highlight one or more nodes within the tree structure (e.g., shown in FIG. 6) that correspond to the test result (e.g., failure) and associated vulnerabilities, allowing the user to identify potential vulnerabilities in the model that are associated with the test results.

Figure 9:
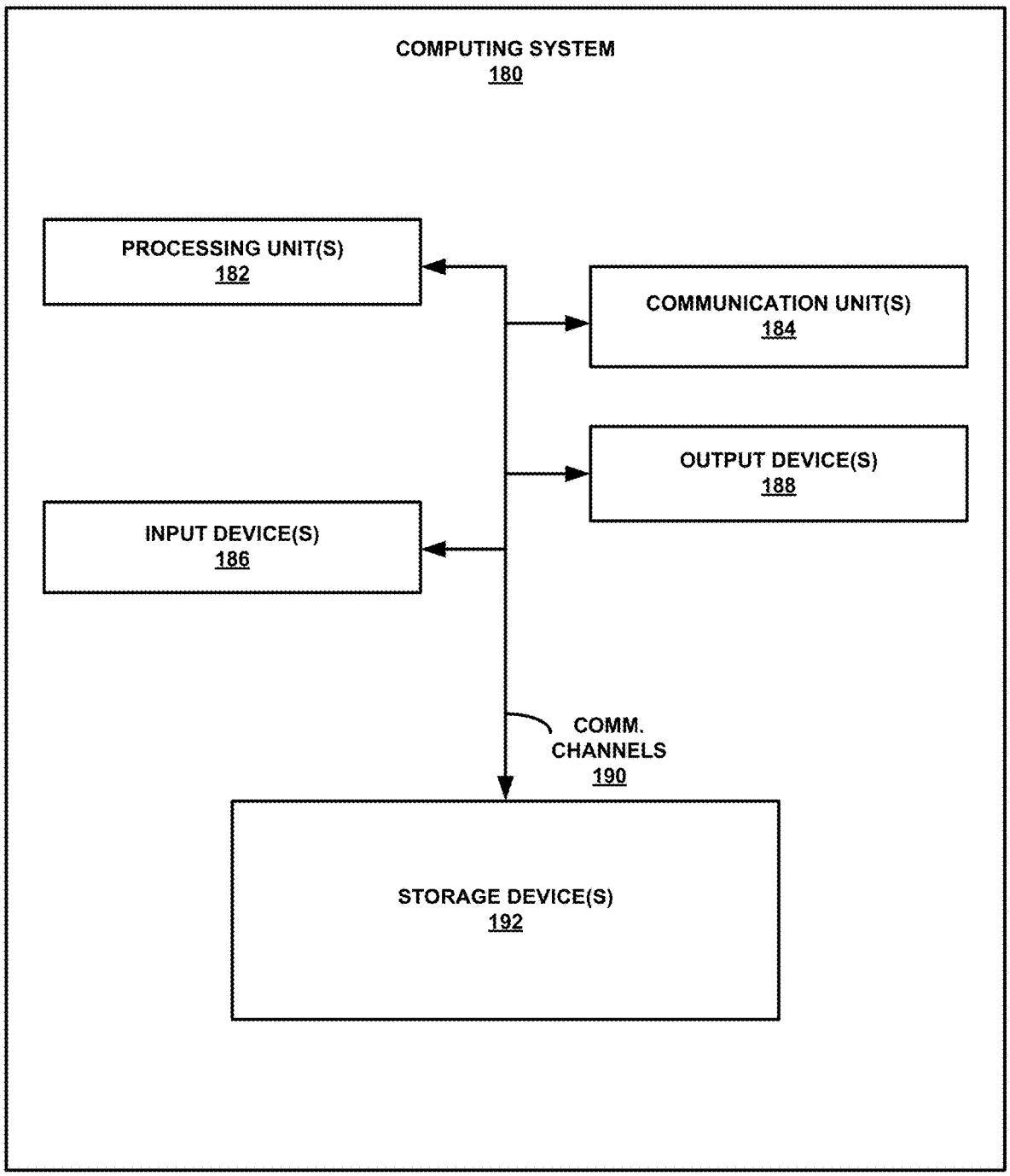
FIG. 9 is a block diagram illustrating further details of an example computing system, such as the analysis computing system or one of the runtime computing systems shown in FIG. 1, in accordance with one or more aspects of the present disclosure.

FIG. 9 is a block diagram illustrating further details of an example computing system 160, such as analysis computing system 2 (FIG. 1) or one of runtime computing systems 20 (FIG. 1), in accordance with one or more aspects of the present disclosure. FIG. 4 illustrates only one particular example of computing system 180, and many other examples of computing system 180 may be used in other instances and may include a subset of the components shown, or may include additional components not shown, in FIG. 9.

As shown in the example of FIG. 9, computing system 180 includes one or more processing units 182, one or more input devices 186, one or more communication units 184, one or more output devices 188, and one or more storage devices 192. Communication channels 190 may interconnect each of the components 182, 184, 186, 188, and 192 for inter-component communications (physically, communicatively, and/or operatively). In some examples, communication channels 190 may include a system bus, a network connection, an inter-process communication data structure, or any other method for communicating data between hardware and/or software.

One or more input devices 186 of computing system 180 may receive input. Examples of input are tactile, audio, and video input. Examples of input devices 186 include a presence-sensitive screen, touch-sensitive screen, mouse, keyboard, voice responsive system, video camera, microphone or any other type of device for detecting input from a human or machine.

One or more output devices 188 of computing system 180 may generate output. Examples of output are tactile, audio, and video output. Examples of output devices 188 include a presence-sensitive screen, sound card, video graphics adapter card, speaker, cathode ray tube (CRT) monitor, liquid crystal display (LCD), or any other type of device for generating output to a human or machine. Output devices 188 may include display devices such as cathode ray tube (CRT) monitor, liquid crystal display (LCD), or any other type of device for generating tactile, audio, and/or visual output.

One or more communication units 184 of computing system 180 may communicate with one or more other computing systems or devices via one or more networks by transmitting and/or receiving network signals on the one or more networks. Examples of communication units 184 include a network interface card (e.g. such as an Ethernet card), an optical transceiver, a radio frequency transceiver, or any other type of device that can send and/or receive information, such as through a wired or wireless network. Other examples of communication units 184 may include short wave radios, cellular data radios, wireless Ethernet network radios, as well as universal serial bus (USB) controllers.

One or more storage devices 192 within computing system 180 may store information for processing during operation of computing system 180 (e.g., computing system 180 may store data accessed by one or more modules, processes, applications, or the like during execution at computing system 180). In some examples, storage devices 192 on computing system 180 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. In some cases, storage devices 192 may include redundant array of independent disks (RAID) configurations and one or more solid-state drives (SSD's).

Storage devices 192, in some examples, also include one or more computer-readable storage media. Storage devices 192 may be configured to store larger amounts of information than volatile memory. Storage devices 192 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 192 may store program instructions and/or data associated with one or more software/firmware elements or modules.

For example, when computing system 180 comprises an example of analysis computing system 2 shown in FIG. 1, storage devices 192 may store local knowledge base 16. In addition, storage devices 192 may store instructions and/or data associated with applications 4, including rule-based/machine learning engine 6, graphical user interface module 8, risk analysis module 10, agents/test modules 12, and import/export module 14, shown in FIG. 1. With respect to agents/test modules 12 shown in FIG. 2, storage devices 192 may store instructions and/or data associated with static analysis tools 30, system state monitors 32, active monitors 34, platform configuration test modules 36, and external probes 38. With respect to rule-based/machine learning engine 6 shown in FIG. 4, storage devices 192 may store instructions and/or data associated with rules engine 100 and machine learning engine 102. Storage devices 192 may also store policies 104 and models/attributes 106.

In other examples, when computing system 180 comprises an example of one or more of runtime computing system 20 (e.g., runtime computing system 20A), storage devices 192 may store instructions and/or data associated with operating systems 60 (including remote agent/command execution units 62 and system libraries 64), applications 66, and application libraries, as shown in FIG. 2. Storage devices 192 may also store instructions and/or data associated with function/API hooks 80 and function/API hooks 82.

Computing system 180 further includes one or more processing units 182 that may implement functionality and/or execute instructions within computing system 180. For example, processing units 182 may receive and execute instructions stored by storage devices 192 that execute the functionality of the elements and/or modules described herein. These instructions executed by processing units 182 may cause computing system 180 to store information within storage devices 192 during program execution. Processing units 182 may also execute instructions of an operating system to perform one or more operations described herein. In those examples in which computing system 180 comprises one or more of runtime computing systems 20, processing units 182 may comprise an example of one or more of hardware components 70 shown in FIG. 2 (e.g., one or more GPU's, one or more FPGA's).

Figure 10:
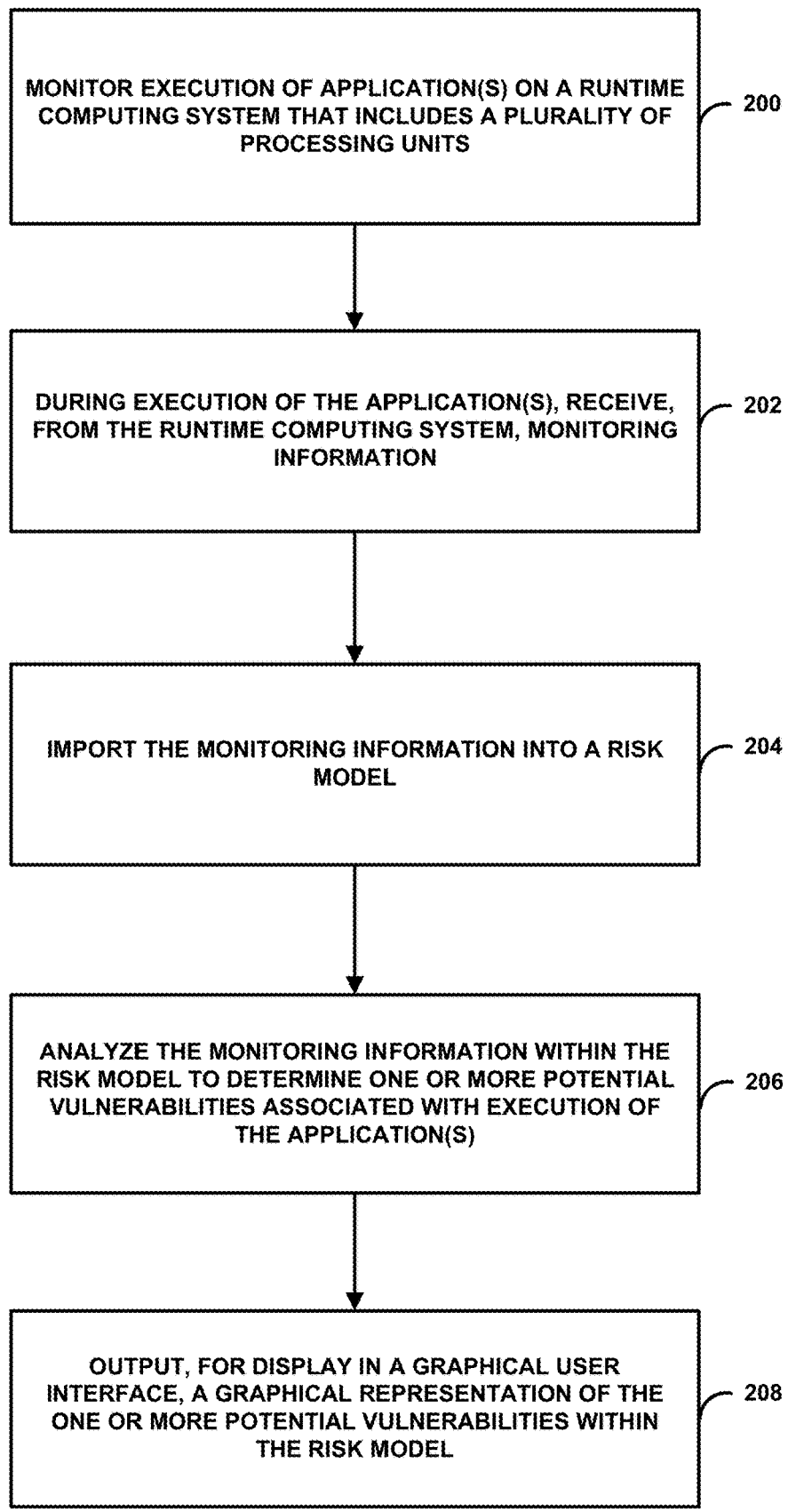
FIG. 10 is a flow diagram illustrating an example process that may be performed by the analysis computing system shown in FIG. 1, in accordance with one or more aspects of the present disclosure.

FIG. 10 is a flow diagram illustrating an example process that may be performed by a computing system, in accordance with one or more aspects of the present disclosure. For example, the process illustrated in FIG. 10, which may comprise one or more operations, may be performed by analysis computing system 2 (FIG. 1).

As illustrated in FIG. 10, the process may include analysis computing system 2 monitoring (200) execution of one or more applications (e.g., applications 66 shown in FIG. 2) on a runtime computing system (e.g., runtime computing system 20A). The runtime computing system includes a group of processing units that perform one or more operations during execution of the one or more applications. During execution of the one or more applications on the runtime computing system, analysis computing system 2 receives (202), from the runtime computing system, monitoring information that includes at least one of function call data or application programming interface call data associated with the one or more operations performed by the processing units during execution of the one or more applications.

Analysis computing system 2 imports (204) the monitoring information into a risk model. Analysis computing system 2 also analyzes (206) the monitoring information within the risk model to determine one or more potential vulnerabilities and one or more potential impacts of the one or more potential vulnerabilities in the runtime computing system, where the one or more potential vulnerabilities are associated with execution of the one or more applications on the runtime computing system. In addition, analysis computing system 2 outputs (208), for display in a graphical user interface, a graphical representation of the one or more potential vulnerabilities and the one or more potential impacts within the risk model.

In some examples, the risk model comprises a hierarchical risk model having a tree structure (e.g., such as shown in FIG. 6), where hierarchical risk model includes a plurality of nodes comprising at least one root node (e.g., "Servers" node in FIG. 6) and one or more sub-nodes (e.g., "File Storage Server," "DNS Server," "DMZ Systems," and "VoIP Server" nodes of FIG. 6), the at least one root node representing at least one higher-level operation associated with execution of the one or more applications, and the one or more sub-nodes each representing a respective lower-level operation associated with execution of the one or more applications. Analyzing the monitoring information within the hierarchical risk model to determine the one or more potential vulnerabilities and the one or more potential impacts may include evaluating the monitoring information within the hierarchical risk model to determine at least one node of the plurality of nodes that is associated with the one or more potential vulnerabilities and the one or more potential impacts. Outputting the graphical representation of the one or more potential vulnerabilities and the one or more potential impacts in the risk model may include graphically emphasizing the at least one node of the hierarchical risk model. In some examples, graphically emphasizing the at least one node of the hierarchical risk model may include graphically emphasizing the at least one node based at least on a respective severity (e.g., one or more respective scores or values, such as described in reference to FIGS. 6-7) of each of the one or more vulnerabilities. The tree structure may comprise an attack tree, where the at least one root node represents at least one higher-level attack goal of one or more attacks performed during execution of the one or more applications, and where the one or more sub-nodes each represents a respective lower-level attack sub-goal of the one or more attacks.

In some examples, the monitoring information that includes at least one of the function call data or the application programming interface call data comprises information that is obtained by the runtime computing system from at least one of a function hook or an application programming interface hook (e.g., one of function/API hooks 80, 82 shown in FIG. 3) during execution of the one or more applications on the runtime computing system. The at least one of the function hook or the application programming interface hook obtains at least one of the respective function call data or the application programming interface call data during execution of the one or more applications. The at least one of the function hook or the application programming interface hook may be configured to intercept one or more library calls and capture data associated with at least one of memory usage, system call invocation information, an execution state, or stack trace information associated with execution of the one or more applications.

In some examples, analyzing the monitoring information within the risk model to determine one or more potential vulnerabilities and the one or more potential impacts further includes utilizing, by the analysis computing system, one or more machine learning models (e.g., models/attributes 106 shown in FIG. 4) to identify a respective likelihood for occurrence of each of the one or more potential vulnerabilities that are associated with execution of the one or more applications. The machine learning models may be trained based on previously identified categories of function and application programming interface calls from prior execution of other applications. Utilizing the one or more machine learning models may include identifying, by the analysis computing system, based on at least one of the one or more potential vulnerabilities, a group of instructions of the one or more applications that are determined as potentially malicious. The previously identified categories of function and application programming interface calls may include a first category of typical call flows and a second category of atypical call flows. The one or more vulnerabilities associated with execution of the one or more applications may be associated with at least one unexpected call sequence or unexpected call stack associated with at least one of the function call data or the application programming interface call data.

In some examples, analyzing the monitoring information within the risk model to determine the one or more potential vulnerabilities and the one or more potential impacts may further include determining one or more test results, included in the monitoring information, indicating a failure of one or more tests performed during execution of the one or more applications. In some examples, the operations of FIG. 10 may further include receiving, by the analysis computing system, additional information associated with the runtime computing system, and combining, by the analysis computing system, the monitoring information with the additional information in the risk model. Analyzing the monitoring information may further include analyzing, by the analysis computing system, the monitoring information combined with the additional information within the risk model to determine the one or more potential vulnerabilities and the one or more potential impacts of the one or more potential vulnerabilities in the runtime computing system. The additional information may include one or more of: source code information associated with an analysis of source code for at least one of an operating system or the one or more applications of the runtime computing system (e.g., via static analysis tools 30 in FIG. 2); system-level state information associated with a state of at least one of the operating system or the one or more applications of the runtime computing system (e.g., via system state monitors 32); platform configuration information associated with a configuration of the runtime computing system (e.g., via platform configuration test modules 36); or probe information associated with one or more external interfaces provided by the runtime computing system (e.g., via external probes 38).

In some examples, the operations of FIG. 10 may further include importing, by the analysis computing system, knowledge base information (e.g., via knowledge base 16 and/or 18 shown in FIG. 1) into the risk model for use in determining the one or more potential vulnerabilities associated with execution of the one or more applications. The knowledge base information may include information associated with previously identified vulnerabilities for other runtime computing systems.

In some examples, the plurality of processing units of the runtime computing system includes at least one graphics processing unit that performs at least one of the one or more operations on the runtime computing system during execution of the one or more applications. the analysis computing system is different from the runtime computing system. In some examples, the analysis computing system may be different from the runtime computing system.

In some examples, the one or more potential impacts of the one or more potential vulnerabilities may include at least one of (1) an impact of information confidentiality during execution of the one or more applications on the runtime computing system, (2) an impact of information integrity during execution of the one or more applications on the runtime computing system, or (3) an impact of information availability during execution of the one or more applications on the runtime computing system.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise RAM, read-only memory (ROM), EEPROM, compact disc ROM (CD-ROM), or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSP's), general purpose microprocessors, application specific integrated circuits (ASIC's), FPGA's, or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of IC's (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

It is to he recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   monitoring, by an analysis computing system, execution of one or more applications on a runtime computing system, wherein the runtime computing system includes a plurality of processing units that perform one or more operations during execution of the one or more applications;
   during execution of the one or more applications on the runtime computing system, receiving, by the analysis computing system and from the runtime computing system, monitoring information that includes at least one of function call data or application programming interface call data associated with the one or more operations performed by the plurality of processing units during execution of the one or more applications, wherein the at least one of the function call data or the application programming interface call data comprises at least one ordered sequence of a plurality of function calls or application programming interface calls that are each intercepted by at least one function hook or application programming interface hook during execution of the one or more applications on the runtime computing system;
   importing, by the analysis computing system, the monitoring information into a risk model;
   analyzing, by the analysis computing system, the monitoring information within the risk model to determine one or more potential vulnerabilities and one or more potential impacts of the one or more potential vulnerabilities in the runtime computing system, wherein the one or more potential vulnerabilities are associated with execution of the one or more applications on the runtime computing system, and wherein the one or more potential vulnerabilities are further associated with at least one unexpected call sequence or unexpected call stack associated with the at least one ordered sequence of the plurality of function calls or application programming interface calls; and
   outputting, by the analysis computing system and for display in a graphical user interface, a graphical representation of the one or more potential vulnerabilities and the one or more potential impacts in the risk model.

2. The method of claim 1,
   wherein the risk model comprises a hierarchical risk model having a tree structure, wherein hierarchical risk model includes a plurality of nodes comprising at least one root node and one or more sub-nodes, the at least one root node representing at least one higher-level operation associated with execution of the one or more applications, and the one or more sub-nodes each representing a respective lower-level operation associated with execution of the one or more applications,
   wherein analyzing the monitoring information within the hierarchical risk model to determine the one or more potential vulnerabilities and the one or more potential impacts comprises evaluating the monitoring information within the hierarchical risk model to determine at least one node of the plurality of nodes that is associated with the one or more potential vulnerabilities and the one or more potential impacts, and
   wherein outputting the graphical representation of the one or more potential vulnerabilities and the one or more potential impacts in the risk model comprises graphically emphasizing the at least one node of the hierarchical risk model.

3. The method of claim 2, wherein graphically emphasizing the at least one node of the hierarchical risk model comprises graphically emphasizing the at least one node based at least on a respective severity of each of the one or more vulnerabilities.

4. The method of claim 2, wherein the tree structure comprises an attack tree, wherein the at least one root node represents at least one higher-level attack goal of one or more attacks performed during execution of the one or more applications, and wherein the one or more sub-nodes each represents a respective lower-level attack sub-goal of the one or more attacks.

5. The method of claim 1, wherein the at least one of the function hook or the application programming interface hook intercepts one or more library calls and captures data associated with at least one of memory usage, system call invocation information, an execution state, or stack trace information associated with execution of the one or more applications.

6. The method of claim 1, wherein analyzing the monitoring information within the risk model to determine one or more potential vulnerabilities and the one or more potential impacts further comprises:
utilizing, by the analysis computing system, one or more machine learning models to identify a respective likelihood for occurrence of each of the one or more potential vulnerabilities that are associated with execution of the one or more applications, wherein the machine learning models are trained based on previously identified categories of function and application programming interface calls from prior execution of other applications.

7. The method of claim 6, wherein utilizing the one or more machine learning models comprises identifying, by the analysis computing system, based on at least one of the one or more potential vulnerabilities, a group of instructions of the one or more applications that are determined as potentially malicious.

8. The method of claim 6, wherein the previously identified categories of function and application programming interface calls comprise a first category of typical call flows and a second category of atypical call flows.

9. The method of claim 1, wherein analyzing the monitoring information within the risk model to determine the one or more potential vulnerabilities and the one or more potential impacts further comprises determining one or more test results, included in the monitoring information, indicating a failure of one or more tests performed during execution of the one or more applications.

10. The method of claim 1, further comprising:
receiving, by the analysis computing system, additional information associated with the runtime computing system; and
combining, by the analysis computing system, the monitoring information with the additional information in the risk model,
wherein analyzing the monitoring information further comprises analyzing, by the analysis computing system, the monitoring information combined with the additional information within the risk model to determine the one or more potential vulnerabilities and the one or more potential impacts of the one or more potential vulnerabilities in the runtime computing system.

11. The method of claim 10, wherein the additional information comprises one or more of:
source code information associated with an analysis of source code for at least one of an operating system or the one or more applications of the runtime computing system;
system-level state information associated with a state of at least one of the operating system or the one or more applications of the runtime computing system;
platform configuration information associated with a configuration of the runtime computing system; or
probe information associated with one or more external interfaces provided by the runtime computing system.

12. The method of claim 1, further comprising importing, by the analysis computing system, knowledge base information into the risk model for use in determining the one or more potential vulnerabilities associated with execution of the one or more applications, wherein the knowledge base information comprises information associated with previously identified vulnerabilities for other runtime computing systems.

13. The method of claim 1, wherein the plurality of processing units of the runtime computing system includes at least one graphics processing unit that performs at least one of the one or more operations on the runtime computing system during execution of the one or more applications.

14. The method of claim 1, wherein the one or more potential impacts of the one or more potential vulnerabilities comprise at least one of (1) an impact of information confidentiality during execution of the one or more applications on the runtime computing system, (2) an impact of information integrity during execution of the one or more applications on the runtime computing system, or (3) an impact of information availability during execution of the one or more applications on the runtime computing system.

15. The method of claim 1, wherein the analysis computing system is different from the runtime computing system.

16. A computing system, comprising:
one or more processors; and
a non-transitory computer-readable storage medium storing instructions that, when executed, cause the one or more processors to:
monitor execution of one or more applications on a runtime computing system, wherein the runtime computing system includes a plurality of processing units that perform one or more operations during execution of the one or more applications;
during execution of the one or more applications on the runtime computing system, receive, from the runtime computing system, monitoring information that includes at least one of function call data or application programming interface call data associated with the one or more operations performed by the plurality of processing units during execution of the one or more applications, wherein the at least one of the function call data or the application programming interface call data comprises at least one ordered sequence of a plurality of function calls or application programming interface calls that are each intercepted by at least one function hook or application programming interface hook during execution of the one or more applications on the runtime computing system;
import the monitoring information into a risk model;
analyze the monitoring information within the risk model to determine one or more potential vulnerabilities and one or more potential impacts of the one or more potential vulnerabilities in the runtime computing system, wherein the one or more potential vulnerabilities are associated with execution of the one or more applications on the runtime computing system, and wherein the one or more potential vulnerabilities are further associated with at least one unexpected call sequence or unexpected call stack associated with the at least one ordered sequence of the plurality of function calls or application programming interface calls; and
output, for display in a graphical user interface, a graphical representation of the one or more potential vulnerabilities and the one or more potential impacts within the risk model.

17. The computing system of claim 16,
wherein the risk model comprises a hierarchical risk model having a tree structure, wherein hierarchical risk model includes a plurality of nodes comprising at least one root node and one or more sub-nodes, the at least one root node representing at least one higher-level operation associated with execution of the one or more applications, and the one or more sub-nodes each representing a respective lower-level operation associated with execution of the one or more applications, wherein the instructions that cause the one or more processors to analyze the monitoring information within the hierarchical risk model to determine the one or more potential vulnerabilities and the one or more potential impacts further cause the one or more processors to evaluate the monitoring information within the hierarchical risk model to determine at least one node of the plurality of nodes that is associated with the one or more potential vulnerabilities and the one or more potential impacts, and wherein the instructions that cause the one or more processors to output the graphical representation of the one or more potential vulnerabilities and the one or more potential impacts in the risk model further cause the one or more processors to graphically emphasize the at least one node of the hierarchical risk model.

18. The computing system of claim 16, wherein the instructions that cause the one or more processors to analyze the monitoring information within the risk model to determine one or more potential vulnerabilities and the one or more potential impacts further cause the one or more processors to:

utilize one or more machine learning models to identify a respective likelihood for occurrence of each of the one or more potential vulnerabilities that are associated with execution of the one or more applications, wherein the machine learning models are trained based on previously identified categories of function and application programming interface calls from prior execution of other applications.

19. The computing system of claim 16, wherein the instructions further cause the one or more processors to:

receive additional information associated with the runtime computing system; and combine the monitoring information with the additional information in the risk model, wherein the instructions that cause the one or more processors to analyze the monitoring information further cause the one or more processors to analyze the monitoring information combined with the additional information within the risk model to determine the one or more potential vulnerabilities and the one or more potential impacts of the one or more potential vulnerabilities in the runtime computing system.

20. The computing system of claim 19, wherein the additional information comprises one or more of:

source code information associated with an analysis of source code for at least one of an operating system or the one or more applications of the runtime computing system;

system-level state information associated with a state of at least one of the operating system or the one or more applications of the runtime computing system;

platform configuration information associated with a configuration of the runtime computing system; or probe information associated with one or more external interfaces provided by the runtime computing system.

21. The computing system of claim 16, wherein the one or more potential impacts of the one or more potential vulnerabilities comprise at least one of (1) an impact of information confidentiality during execution of the one or more applications on the runtime computing system, (2) an impact of information integrity during execution of the one or more applications on the runtime computing system, or (3) an impact of information availability during execution of the one or more applications on the runtime computing system.

22. The computing system of claim 16, wherein the at least one of the function hook or the application programming interface hook intercepts one or more library calls and captures data associated with at least one of memory usage, system call invocation information, an execution state, or stack trace information associated with execution of the one or more applications.

23. The computing system of claim 16, wherein the plurality of processing units of the runtime computing system includes at least one graphics processing unit that performs at least one of the one or more operations on the runtime computing system during execution of the one or more applications.

24. A non-transitory computer-readable storage medium storing instructions that, when executed, cause a computing system to perform operations comprising:

monitoring execution of one or more applications on a runtime computing system, wherein the runtime computing system includes a plurality of processing units that perform one or more operations during execution of the one or more applications;

during execution of the one or more applications on the runtime computing system, receiving, from the runtime computing system, monitoring information that includes at least one of function call data or application programming interface call data associated with the one or more operations performed by the plurality of processing units during execution of the one or more applications, wherein the at least one of the function call data or the application programming interface call data comprises at least one ordered sequence of a plurality of function calls or application programming interface calls that are each intercepted by at least one function hook or application programming interface hook during execution of the one or more applications on the runtime computing system;

importing the monitoring information into a risk model;

analyzing the monitoring information within the risk model to determine one or more potential vulnerabilities and one or more potential impacts of the one or more potential vulnerabilities in the runtime computing system, wherein the one or more potential vulnerabilities are associated with execution of the one or more applications on the runtime computing system, and wherein the one or more potential vulnerabilities are further associated with at least one unexpected call sequence or unexpected call stack associated with the at least one ordered sequence of the plurality of function calls or application programming interface calls; and outputting, for display in a graphical user interface, a graphical representation of the one or more potential vulnerabilities and the one or more potential impacts within the risk model.

25. The non-transitory computer-readable storage medium of claim 24, wherein the risk model comprises a hierarchical risk model having a tree structure, wherein hierarchical risk model includes a plurality of nodes comprising at least one root node and one or more sub-nodes, the at least one root node representing at least one higher-level operation associated with execution of the one or more applications, and the one or more sub-nodes each representing a respective lower-level operation associated with execution of the one or more applications, wherein analyzing the monitoring information within the hierarchical risk model to determine the one or more potential vulnerabilities and the one or more potential impacts comprises evaluating the monitoring information within the hierarchical risk model to determine at least one node of the plurality of nodes that is associated with the one or more potential vulnerabilities and the one or more potential impacts, and wherein outputting the graphical representation of the one or more potential vulnerabilities and the one or more potential impacts in the risk model comprises graphically emphasizing the at least one node of the hierarchical risk model.

26. The non-transitory computer-readable storage medium of claim 24, wherein analyzing the monitoring information within the risk model to determine one or more potential vulnerabilities and the one or more potential impacts further comprises:

utilizing one or more machine learning models to identify a respective likelihood for occurrence of each of the one or more potential vulnerabilities that are associated with execution of the one or more applications, wherein the machine learning models are trained based on previously identified categories of function and application programming interface calls from prior execution of other applications.

27. The non-transitory computer-readable storage medium of claim 26, wherein utilizing the one or more machine learning models comprises identifying based on at least one of the one or more potential vulnerabilities, a group of instructions of the one or more applications that are determined as potentially malicious.

28. The non-transitory computer-readable storage medium of claim 24, wherein the one or more potential impacts of the one or more potential vulnerabilities comprise at least one of (1) an impact of information confidentiality during execution of the one or more applications on the runtime computing system, (2) an impact of information integrity during execution of the one or more applications on the runtime computing system, or (3) an impact of information availability during execution of the one or more applications on the runtime computing system.

29. The non-transitory computer-readable storage medium of claim 24, wherein the at least one of the function hook or the application programming interface hook intercepts one or more library calls and captures data associated with at least one of memory usage, system call invocation information, an execution state, or stack trace information associated with execution of the one or more applications.

* * * * *